United States Patent [19]
Ueno

[11] Patent Number: 6,062,035
[45] Date of Patent: May 16, 2000

[54] AIR CONDITIONER

[75] Inventor: Takeo Ueno, Osaka, Japan

[73] Assignee: Daikin Industries, Ltd., Osaka, Japan

[21] Appl. No.: 09/051,795

[22] PCT Filed: Oct. 24, 1996

[86] PCT No.: PCT/JP96/03131

§ 371 Date: Apr. 22, 1998

§ 102(e) Date: Apr. 22, 1998

[87] PCT Pub. No.: WO97/15789

PCT Pub. Date: May 1, 1997

[30] Foreign Application Priority Data

Oct. 24, 1995 [JP] Japan .................................... 7-275895

[51] Int. Cl.[7] ............................. F25B 13/00; F25D 17/02
[52] U.S. Cl. ........................... 62/324.1; 62/324.4; 62/434
[58] Field of Search .................................. 62/59, 49, 113, 62/324.1, 324.4, 332, 430, 434, 238.7

[56] References Cited

U.S. PATENT DOCUMENTS

| | | | |
|---|---|---|---|
| 4,576,009 | 3/1986 | Ogushi et al. | ............................. 62/3.3 |
| 4,843,832 | 7/1989 | Yamada et al. | ........................... 62/159 |
| 5,339,893 | 8/1994 | Haynes et al. | ............................. 165/45 |
| 5,507,158 | 4/1996 | Bernier | ..................................... 62/482 |

FOREIGN PATENT DOCUMENTS

| | | | |
|---|---|---|---|
| 48-18843 | 3/1973 | Japan . | |
| 217133 | 12/1983 | Japan | .................... 62/238.7 |
| 60-171389 | 9/1985 | Japan . | |
| 61-70387 | 4/1986 | Japan . | |
| 62-26491 | 2/1987 | Japan . | |
| 62-238951 | 10/1987 | Japan . | |
| 1-107031 | 4/1989 | Japan . | |
| 5-306849 | 11/1993 | Japan . | |
| 7-167461 | 7/1995 | Japan . | |

*Primary Examiner*—William Doerrler
*Attorney, Agent, or Firm*—Nixon Peabody LLP; Donald R. Studebaker

[57] ABSTRACT

By using a heat storage circuit or a refrigerating cycle as a heat source, cold heat or hot heat is applied from the heat source to secondary refrigerant in a main refrigerant circuit (20). By a heating or a cooling action of a small-sized refrigerating machine (40), a moving force is given to refrigerant in the main refrigerant circuit (20). Thereby, the secondary refrigerant in the main refrigerant circuit (20) circulates between a heat source-side heat exchanger (21) and an indoor heat exchanger (22) to heat or cool a room.

37 Claims, 14 Drawing Sheets

AIR CONDITIONER

TECHNICAL FIELD

This invention relates to an air conditioner and particularly relates to an air conditioner using secondary refrigerant.

BACKGROUND ART

There is known a conventional air conditioner having two refrigerant circuits, i.e., a primary refrigerant circuit and a secondary refrigerant circuit, as disclosed in Japanese Patent Application Laid-Open Gazette No. 62-238951. The primary refrigerant circuit is configured such that a compressor, a first heat source-side heat exchanger, a pressure reduction mechanism and a first user-side heat exchanger are connected in this order. The secondary refrigerant circuit is configured such that a pump, a second heat source-side heat exchanger and a second user-side heat exchanger are connected in this order.

Heat exchange is made between the first user-side heat exchanger of the primary refrigerant circuit and the second heat source-side heat exchanger of the secondary refrigerant circuit. The second user-side heat exchanger is placed in a room and air-conditions the room.

PROBLEMS THAT THE INVENTION IS TO SOLVE

In the above-mentioned air conditioner, however, it is necessary to provide a pump for transferring refrigerant in the secondary refrigerant circuit. Further, in order to execute both cooling and heating operations, liquid refrigerant and gas refrigerant must be transferred with reliability and therefore it is necessary to provide a pump for liquid and a pump for gas. Furthermore, the pump for gas requires large power and the pump for liquid must be configured such that gas refrigerant cannot flow thereinto.

To cope with the above problems, there is proposed a technique that the secondary refrigerant circuit is formed of a natural circulation type refrigerant circuit. As disclosed in Japanese Patent Application Laid-Open Gazette No. 48-18843, in the natural circulation type refrigerant circuit, a condenser is placed in a higher position while an evaporator is placed in a lower position, and the condenser and the evaporator are connected to each other through a gas pipe and a liquid pipe. Heat exchange is made between the first user-side heat exchanger of the primary refrigerant circuit and the condenser to circulate refrigerant and the room is cooled by the evaporator.

However, the use of the above natural circulation type refrigerant circuit necessitates both of a refrigerant circuit for cooling operation and a refrigerant circuit for heating operation. More specifically, for example, it is necessary that the condenser under cooling operation is placed at a rooftop while the evaporator under heating operation is placed underground and both the condenser and the evaporator are connected to an indoor heat exchanger.

This complicates piping system thereby expending considerable time and effort on installation.

The present invention has been made in view of the above problems and has its object of enabling refrigerant to circulate without the use of a pump for transferring refrigerant and simplifying piping system.

DISCLOSURE OF INVENTION

SUMMARY OF INVENTION

An air conditioner of this invention has, as a heat source, a heat storage circuit or a refrigerating cycle, applies low temperature heat or high temperature hot heat from the heat source to secondary refrigerant in a main refrigerant circuit (20), and gives a moving force to the refrigerant of the main refrigerant circuit (20) by a heating or a cooling operation of a small-sized refrigerating machine (40). Thereby, the room is cooled or heated by a user-side heat exchanger (22) of the main refrigerant circuit (20). Thus, since cooling and heating operations can be executed by the single main refrigerant circuit (20), this provides simplified piping system.

FEATURES OF INVENTION

More specifically, as shown in FIG. 1, a first solution taken in the invention comprises a main refrigerant circuit (20) which is formed in a manner that a heat source-side heat exchanger (21) and a user-side heat exchanger (22) are at least connected through a refrigerant pipe (23) and in which refrigerant is circulated in a manner to be condensed in one of the heat exchangers (21, 22) and to be evaporated in the other heat exchanger (21, 22).

Further, the first solution comprises heat source means (30) for applying heat to refrigerant in the heat source-side heat exchanger (21) of the main refrigerant circuit (20).

In addition, the first solution comprises refrigerating means (40) for refrigerant transfer which is formed in a manner that a compressor (41), a first sub-heat exchanger (43), an expansion mechanism (4V) and a second sub-heat exchanger (44) are connected in this order and forms a single refrigerating cycle reciprocally operable in a manner that sub-refrigerant is condensed in one of the sub-heat exchangers (43, 44) and is evaporated in the other sub-heat exchanger (43, 44) and in which both the sub-heat exchangers (43, 44) are connected to some midpoint in a liquid line (23-L) of the main refrigerant circuit (20) and the sub-refrigerant cools and heats liquid refrigerant of the main refrigerant circuit (20) thereby giving a moving force to the liquid refrigerant.

A second solution taken in the invention is configured such that in the first solution, an expansion mechanism (EV-A) is provided at a part of the refrigerant pipe (23) between the heat source-side heat exchanger (21) and the user-side heat exchanger (22) in the main refrigerant circuit (20).

A third solution taken in the invention is configured such that in the first solution, a flow rate adjusting mechanism (FV) for adjusting a flow rate of refrigerant is provided at a part of the refrigerant pipe (23) between the heat source-side heat exchanger (21) and the user-side heat exchanger (22) in the main refrigerant circuit (20).

A fourth solution taken in the invention is configured such that in the first, second or third solution, the heat source-side heat exchanger (21) and the user-side heat exchanger (22) of the main refrigerant circuit (20) are at least placed in a higher position and a lower position, respectively. Further, the fourth solution is configured such that during a cooling operation, refrigerant in the main refrigerant circuit (20) naturally circulates between the heat source-side heat exchanger (21) and the user-side heat exchanger (22), and during a heating operation, the refrigerating means (40) for refrigerant transfer is driven so that the refrigerant in the main refrigerant circuit (20) circulates between the heat source-side heat exchanger (21) and the user-side heat exchanger (22).

A fifth solution taken in the invention is configured such that in the first, second or third solution, the user-side heat exchanger (22) and the heat source-side heat exchanger (21) of the main refrigerant circuit (20) are at least placed in a higher position and a lower position, respectively. Further, the fourth solution is configured such that during a heating operation, refrigerant in the main refrigerant circuit (20) naturally circulates between the heat source-side heat exchanger (21) and the user-side heat exchanger (22), and during a cooling operation, the refrigerating means (40) for refrigerant transfer is driven so that the refrigerant in the main refrigerant circuit (20) circulates between the heat source-side heat exchanger (21) and the user-side heat exchanger (22).

A sixth solution taken in the invention is configured such that in the first, second or third solution, the refrigerating means (40) for refrigerant transfer heats liquid refrigerant of the main refrigerant circuit (20) to discharge the liquid refrigerant from one of the sub-heat exchangers (43, 44) and cools refrigerant of the main refrigerant circuit (20) to store liquid refrigerant in the other sub-heat exchangers (43, 44).

A seventh solution taken in the invention is configured such that in the first, second or third solution, the heat source-side heat exchanger (21) is composed of a low temperature heat source-side heat exchanger (21-C) and a high temperature heat source-side heat exchanger (21-H). The heat source means (30) is composed of: a low temperature heat water circuit (30-C) for circulating low temperature heat water between a heat storage tank (3T-C) and the low temperature heat source-side heat exchanger (21-C) so that the low temperature heat water stored in the heat storage tank (3T-C) is supplied to the low temperature heat source-side heat exchanger (21-C) thereby applying cold low temperature heat to refrigerant in the low temperature heat source-side heat exchanger (21-C); a high temperature heat water circuit (30-H) for circulating high temperature heat water between a heat storage tank (3T-H) and the high temperature heat source-side heat exchanger (21-H) so that the high temperature heat water stored in the heat storage tank (3T-H) is supplied to the high temperature heat source-side heat exchanger (21-H) thereby applying high temperature heat to refrigerant in the high temperature heat source-side heat exchanger (21-H); and refrigerating means (30-R) for heat source for cooling the low temperature heat water in the low temperature heat water circuit (30-C) and heating the high temperature water in the hot heat water circuit (30-H) to store heat in the low temperature heat water circuit (30-C) and the high temperature heat water circuit (30-H), respectively.

An eighth solution taken in the invention is configured, as shown in FIG. 6, so that in the first, second or third solution, the heat source-side heat exchanger (21) is formed of a single heat exchanger. The heat source means (30) is composed of: a heat source water circuit (30-S) for circulating heat source water between a heat storage tank (3T) and the heat source-side heat exchanger (21) so that the heat source water stored in the heat storage tank (3T) is supplied to the heat source-side heat exchanger (21) thereby applying low temperature heat or high temperature heat to refrigerant in the heat source-side heat exchanger (21); and refrigerating means (30-R) for heat source for cooling or heating the heat source water in the heat source water circuit (30-S) to store heat in heat source water.

A ninth solution taken in the invention is configured, as shown in FIG. 8, so that in the first, second or third solution, the heat source-side heat exchanger (21) is composed of a low temperature heat source-side heat exchanger (21-C) and a high temperature heat source-side heat exchanger (21-H). The heat source means (30) is composed of: a low temperature heat water circuit (30-C) for circulating low temperature heat water between a heat storage tank (3T-C) and the low temperature heat source-side heat exchanger (21-C) so that the low temperature heat water stored in the heat storage tank (3T-C) is supplied to the low temperature heat source-side heat exchanger (21-C) thereby applying low temperature heat to refrigerant in the low temperature heat source-side heat exchanger (21-C); and refrigerating means (30-R) for heat source which includes a compressor (33), a main heat exchanger (35), expansion mechanisms (EVM1, . . . ) and a low temperature heat exchanger (36), is connected to the high temperature heat source-side heat exchanger (21-H), cools the low temperature heat water of the low temperature heat water circuit (30-C) in the low temperature heat exchanger (36) to store heat in the low temperature heat water circuit (30-C) and applies low temperature heat or hot heat to refrigerant of the main refrigerant circuit (20) in the high temperature heat source-side heat exchanger (21-H).

A tenth solution taken in the invention is configured, as shown in FIG. 10, so that in the first, second or third solution, the heat source-side heat exchanger (21) is formed of a single heat exchanger. The heat source means (30) is composed of refrigerating means (30-R) for heat source which includes a compressor (33), a main heat exchanger (35) and an expansion mechanism (EV-M), is connected to the heat source-side heat exchanger (21) and applies low temperature heat or high temperature heat to refrigerant of the main refrigerant circuit (20) in the heat source-side heat exchanger (21).

An eleventh solution taken in the invention is configured such that in the first, second or third solution, the heat source means (30) and the heat source-side heat exchanger (21) of the main refrigerant circuit (20) are placed in higher positions and the user-side heat exchanger (22) of the main refrigerant circuit (20) is placed in a lower position.

A twelfth solution taken in the invention is configured such that in the first, second or third solution, the user-side heat exchanger (22) of the main refrigerant circuit (20) is placed in a higher position and the heat source means (30) and the heat source-side heat exchanger (21) of the main refrigerant circuit (20) are placed in lower positions.

A thirteenth solution taken in the invention is configured such that in the first, second or third solution, a plurality of the main refrigerant circuits (20) are provided and a plurality of the refrigerating means (40) for refrigerant transfer are provided in correspondence with the main refrigerant circuits (20).

A fourteenth solution taken in the invention is configured, as shown in FIG. 12, so that in the first, second or third solution, the heat source-side heat exchanger (21) is formed of a single heat exchanger. The main refrigerant circuit (20) is configured in a reciprocally operable manner that refrigerant passes through both the sub-heat exchangers (43, 44) of the refrigerating means (40) for refrigerant transfer during either operation of a cooling cycle in which the heat source-side heat exchanger (21) serves as a condenser and the user-side heat exchanger (22) serves as an evaporator and a heating cycle in which the user-side heat exchanger (22) serves as a condenser and the heat source-side heat exchanger (21) serves as an evaporator. The heat source means (30) is composed of refrigerating means (30-R) for heat source which includes a compressor (33), a main heat exchanger (35) and an expansion mechanism (EV-M), is connected to the heat source-side heat exchanger (21) and applies cold heat or hot heat to refrigerant of the main refrigerant circuit (20) in the heat source-side heat exchanger (21).

A fifteenth solution taken in the invention is configured, as shown in FIG. 13, so that in the first, second or third solution, the main refrigerant circuit (20) is configured in a reciprocally operable manner between a cooling cycle in which the heat source-side heat exchanger (21) serves as a condenser and the user-side heat exchanger (22) serves as an evaporator and a heating cycle in which the user-side heat exchanger (22) serves as a condenser and the heat source-side heat exchanger (21) serves as an evaporator.

Further, the heat source means (30) is composed of refrigerating means (30-R) for heat source which includes a compressor (33), a main heat exchanger (35) and an expansion mechanism (EV-M), is connected to the heat source-side heat exchanger (21) and applies low temperature heat or high temperature heat to refrigerant of the main refrigerant circuit (20) in the heat source-side heat exchanger (21).

The refrigerating means (40) for refrigerant transfer is configured in a manner that the compressor of refrigerating means (40) for refrigerant transfer the doubles as the compressor (33) of the refrigerating means (30-R) for heat source, the first sub-heat exchanger (43), the expansion mechanism (4V) and the second sub-heat exchanger (44) are connected in this order and are connected to the compressor (33) of the refrigerating means (30-R) for heat source, and both the sub-heat exchangers (43, 44) are connected to the liquid line (23-L) of the main refrigerant circuit (20) so that refrigerant in the main refrigerant circuit (20) passes through both the sub-heat exchangers (43, 44) during either operation of the cooling and heating cycles of the main refrigerant circuit (20).

A sixteenth solution of the invention is configured, as shown in FIG. 14, so that in the first, second or third solution, the heat source-side heat exchanger (21) of the main refrigerant circuit (20) is composed of a low temperature heat source-side heat exchanger (21-C) and a high temperature heat source-side heat exchanger (21-H), and the main refrigerant circuit (20) includes a plurality of the user-side heat exchangers (22, 22, . . . ) and circulates refrigerant in a manner that refrigerant is condensed in at least one of the user-side heat exchangers (22, 22,. . . ) and is evaporated in the other user-side heat exchangers (22, 22, . . . ).

Further, the heat source means (30) is composed of refrigerating means (30-R) for heat source in which a compressor (33), a high temperature heat source-side heat exchanger (21-H), an expansion mechanism (EV-M) and a low temperature heat source-side heat exchanger (21-C) are connected and which evaporates refrigerant of the main refrigerant circuit (20) in the hot heat source-side heat exchanger (21-H) and condenses refrigerant of the main refrigerant circuit (20) in the low temperature heat source-side heat exchanger (21-C).

Both the sub-heat exchangers (43, 44) of the refrigerating means (40) for refrigerant transfer are connected to some midpoint in the liquid line (23-L) between the low temperature heat source-side heat exchanger (21-C) and the high temperature heat source-side heat exchanger (21-H) of the main refrigerant circuit (20).

Operations the first, second, third, seventh and thirteenth solutions of the invention, for example, when the heat source means (30) and the heat source-side heat exchanger (21) of the main refrigerant circuit (20) are placed in higher positions and the user-side heat exchanger (22) of the main refrigerant circuit (20) is placed in a lower position as in the fourth and eleventh solutions, the operation of the refrigerating means (40) for refrigerant transfer is stopped during the cooling operation so that refrigerant in the main refrigerant circuit (20) naturally circulates.

In detail, refrigerant in the main refrigerant circuit (20) is heat-exchanged with low temperature heat water in the low temperature heat source-side heat exchanger (21-C) to receive low temperature heat from the low temperature heat water thereby condensing into liquid refrigerant. Since the low temperature heat source-side heat exchanger (21-C) is placed in a higher position, the liquid refrigerant moves down due to the weight of itself, flows into the user-side heat exchanger (22) and evaporates therein into gas refrigerant. The change of state of the refrigerant from liquid to gas expands the volume of the refrigerant so that the refrigerant returns to the low temperature heat source-side heat exchanger (21-C) located in the higher position. The refrigerant receives low temperature heat from low temperature heat water to condense again. Such an action is repeated.

On the other hand, during the heating operation, refrigerant in the main refrigerant circuit (20) cannot naturally circulate. Therefore, the refrigerant in the main refrigerant circuit (20) is circulated by driving the refrigerating means (40) for refrigerant transfer. More specifically, the refrigerant in the main refrigerant circuit (20) is heat-exchanged with high temperature heat water in the hot heat source-side heat exchanger (21-H) to receive high temperature heat from the high temperature heat water thereby evaporating into gas refrigerant. The gas refrigerant flows into the user-side heat exchanger (22) to condense into liquid refrigerant. The liquid refrigerant flows into both the sub-heat exchangers (43, 44) of the refrigerating means (40) for refrigerant transfer.

Thereafter, in the sixth solution of the invention, sub-refrigerant repeatedly circulates in a manner to be discharged from the compressor (41), condense in one of the sub-heat exchangers (43, 44), expand in the expansion mechanism (4V), evaporate in the other sub-heat exchanger (43, 44) and then return to the compressor (41). The sub-heat exchanger (43, 44) serving as a condenser heats refrigerant of the main refrigerant circuit (20) to raise the pressure of the refrigerant so that the refrigerant is discharged therefrom to obtain a moving force.

Further, the sub-heat exchanger (43, 44) serving as an evaporator cools refrigerant of the main refrigerant circuit (20) to lower the pressure of the refrigerant so that liquid refrigerant flows into the sub-heat exchanger (43, 44). The discharge and inflow of the refrigerant are alternately repeated between both the sub-heat exchangers (43, 44) so that liquid refrigerant in the main refrigerant circuit (20) substantially continues to return to the high temperature heat source-side heat exchanger (21-H) located in the higher position. Such an action is repeated.

Particularly, in the seventh, eighth and ninth solutions of the invention, refrigerant in the main refrigerant circuit (20) receives low temperature heat from the low temperature heat water circuit (30-C) in the cold heat source-side heat exchanger (21-H). In the tenth solution of the invention, refrigerant in the main refrigerant circuit (20) receives cold heat from the refrigerating means (30-R) for heat source.

Further, in the seventh and eighth solutions of the invention, refrigerant in the main refrigerant circuit (20) receives high temperature heat from the high temperature heat water circuit (30-H) in the high temperature heat source-side heat exchanger (21-H). In the ninth and tenth solutions of the invention, refrigerant in the main refrigerant circuit (20) receives high temperature heat from the refrigerating means (30-R) for heat source.

In the fifth and twelfth solutions of the invention, the user-side heat exchanger (22) of the main refrigerant circuit (20) is placed in a higher position and the heat source means

(30) and the heat source-side heat exchanger (21) of the main refrigerant circuit (20) are placed in lower positions. Accordingly, during the heating operation, refrigerant in the main refrigerant circuit (20) naturally circulates. On the other hand, during the cooling operation, refrigerant in the main refrigerant circuit (20) is circulated by driving the refrigerating means (40) for refrigerant transfer.

In the fourteenth solution of the invention, the main refrigerant circuit (20) is reciprocatably operated in the cooling cycle and the heating cycle so that the refrigerating means (40) for refrigerant transfer is driven during both the cooling and heating operations thereby circulating refrigerant in the main refrigerant circuit (20).

In the fifteenth solution of the invention, sub-refrigerant in the refrigerating means (40) for refrigerant transfer is circulated with the use of the compressor (33) of the refrigerating means (30-R) for heat source.

In the sixteenth solution of the invention, refrigerant in the refrigerating means (30-R) for heat source is condensed and evaporated in the low temperature heat source-side heat exchanger (21-C) and the hot heat source-side heat exchanger (21-H), respectively, so that heat is recovered.
Effects of Invention According to the present invention, since a force of transfer of refrigerant of the main refrigerant circuit (20) is obtained by heat energy of the heat source means (30), the cooling and heating operations can be executed with the use of the single main refrigerant circuit (20). This provides simplified piping system and further facilitates installation.

Further, since refrigerant is transferred by heat energy without the use of a pump or the like, refrigerant transfer can be executed with reliability under small power.

Furthermore, since the heat source means (30) forming a large-sized main refrigerating machine can be placed only at a rooftop or the like, the maintenance of lubricating oil can be facilitated. This reduces failures due to oil discharge and the like thereby providing an increased reliability.

Further, since it is prevented that the heat source means (30) is subjected to stress due to change in load in the room, this increases reliability. For example, even if liquid refrigerant is returned from the user-side heat exchanger (22) to the heat source-side heat exchanger (21) during the cooling operation, there is no need for consideration of an operation in wet condition since the compressor (33) as required in the conventional refrigerating cycle is not required. This increases the reliability of the air conditioning operation.

According to the seventh, eighth and ninth solutions of the invention, since the low temperature heat water circuit (30-C) or the like is provided, heat storage can be made during the night. This enables effective use of electric power.

According to the ninth solution of the invention, since the refrigerating means (30-R) for heat source also applies low temperature heat to refrigerant in the main refrigerant circuit (20), the cooling operation can be executed with reliability even when low temperature heat water becomes short. This increases the reliability of the cooling operation.

According to the fourteenth solution of the invention, since the refrigerating means (40) for refrigerant transfer transfers refrigerant when the main refrigerant circuit (20) is in either operating condition of the cooling and heating cycles, the low temperature heat source-side heat exchanger (21-C) and the high temperature heat source-side heat exchanger (21-H) can be placed regardless of a level difference at which they are placed. This increases the flexibility of layout.

According to the fifteenth solution of the invention, since the compressor (33) of the refrigerating means (30-R) for heat source doubles as the compressor of the refrigerating means (40) for refrigerant transfer, a moving force as well as heat can be applied to refrigerant in the main refrigerant circuit (20) by the single compressor (33). This decreases the number of elements thereby simplifying the configuration of the air conditioner.

According to the sixteenth solution of the invention, since refrigerant in the refrigerating means (30-R) for heat source is condensed and evaporated in the low temperature heat source-side heat exchanger (21-C) and the high temperature heat source-side heat exchanger (21-H) of the main refrigerant circuit (20), respectively, heat discharged from the main refrigerant circuit (20) can be recovered by the refrigerating means (30-R) for heat source. This increases efficiency.

BEST MODE FOR CARRYING OUT THE INVENTION

Detailed description is made below about embodiments of the invention with reference to the drawings.
Embodiment 1

Figure 1:
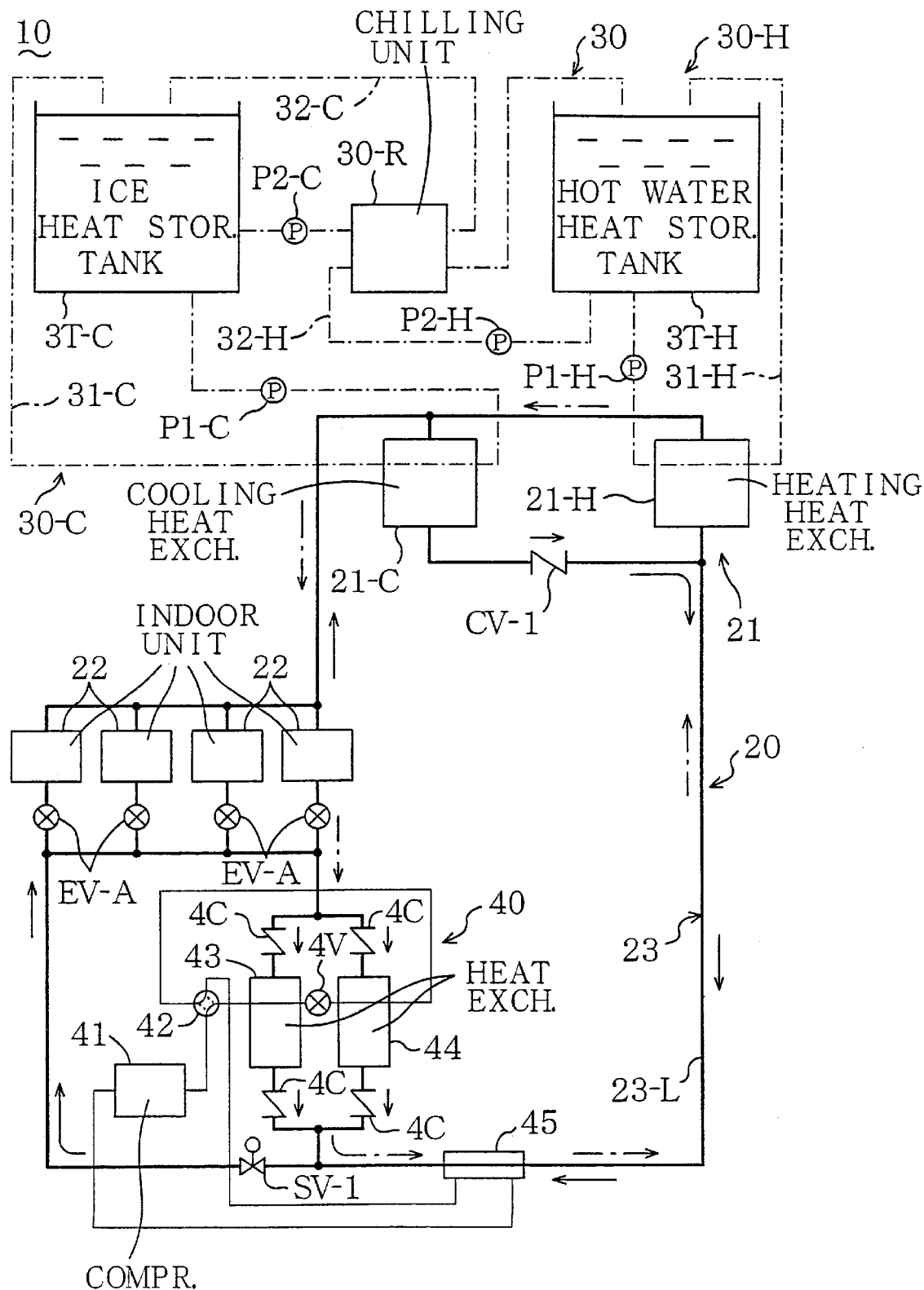
FIG. 1 is a refrigerant circuit diagram of an air conditioner according to Embodiment 1 of the invention.

FIG. 1 shows an embodiment according to the first, fourth, seventh and eleventh solutions of the invention. An air conditioner (10) of this embodiment air-conditions rooms of a building or the like with the use of commonly-called secondary refrigerant system and has a main refrigerant circuit (20), a heat source means (30) and a sub-refrigerating machine (40) as a refrigerating means for refrigerant transfer.

The main refrigerant circuit (20) is formed into a closed circuit in which a high temperature heat source-side heat exchanger (21) and a plurality of indoor heat exchangers (22, 22, ...) as user-side heat exchangers are connected through a refrigerant pipe (23), and is filled with secondary refrigerant. The high temperature heat source-side heat exchanger (21) is configured such that a cooling heat exchanger (21-C) as a low temperature heat source-side heat exchanger and a heating heat exchanger (21-H) as a high temperature heat source-side heat exchanger are connected in parallel with each other. The indoor heat exchangers (22, 22, ...) are connected in parallel with each other. Expansion valves (EV-A, EV-A, ...) as expansion mechanisms are provided at liquid-side branched parts of the refrigerant pipe (23), respectively, in correspondence with the indoor heat exchangers (22, 22, ...).

At a liquid-side part of the refrigerant pipe (23) between the cooling heat exchanger (21-C) and the heating heat exchanger (21-H), a check valve (CV-1) is provided for allowing a flow of refrigerant from the cooling heat exchanger (21-C) to the indoor heat exchangers (22, 22, ...). A liquid line (23-L) of the main refrigerant circuit (20) is provided with a solenoid valve (SV-1).

The heat source means (30) is composed of a low temperature heat water circuit (30-C), a high temperature heat water circuit (30-H) and a chilling unit (30-R) as a refrigerating means for heat source, and is placed at a rooftop of a building or the like. In association with the placement of the heat source means (30) at the rooftop, the cooling heat exchanger (21-C) and the heating heat exchanger (21-H) of the main refrigerant circuit (20) are also placed at the rooftop.

The low temperature heat water circuit (30-C) is configured such that a circulation passage (31-C) is connected to a heat storage tank (3T-C) for storing low temperature heat in the state of ice. The circulation passage (31-C) has a circulation pump (P1-C) and is connected to the cooling heat exchanger (21-C) of the main refrigerant circuit (20). The low temperature heat water circuit (30-C) circulates low temperature heat water between the heat storage tank (3T-C) and the cooling heat exchanger (21-C) so as to supply low temperature heat water stored in the heat storage tank (3T-C) to the cooling heat exchanger (21-C) thereby applying low temperature heat to refrigerant in the cooling heat exchanger (21-C).

The high temperature heat water circuit (30-H) is configured such that a circulation passage (31-H) is connected to a heat storage tank (3T-H) for storing high temperature heat in the state of hot water. The circulation passage (31-H) has a circulation pump (P1-H) and is connected to the heating heat exchanger (21-H) of the main refrigerant circuit (20). The high temperature heat water circuit (30-H) circulates high temperature heat water between the heat storage tank (3T-H) and the heating heat exchanger (21-H) so as to supply high temperature heat water stored in the heat storage tank (3T-H) to the heating heat exchanger (21-H) thereby applying high temperature heat to refrigerant in the heating heat exchanger (21-H).

The chilling unit (30-R) includes a compressor, a four-way selector valve, a condenser, an expansion valve and an evaporator thereby forming a main refrigerating machine, though they are not shown. Further, the chilling unit (30-R) is connected to the heat storage tank (3T-C) of the low temperature heat water circuit (30-C) through a heat storage passage (32-C) having a circulation pump (P2-C), and is connected to the heat storage tank (3T-H) of the high temperature heat water circuit (30-H) through a heat storage passage (32-H) having a circulation pump (P2-H). The chilling unit (30-R) cools low temperature heat water in the low temperature heat water circuit (30-C) to store ice in the heat storage tank (3T-C) and heats high temperature heat water in the high temperature heat water circuit (30-H) to store hot water in the heat storage tank (3T-H).

The sub-refrigerating machine (40) is a feature of the present invention. Specifically, the sub-refrigerating machine (40) is configured such that a compressor (41), a four-way selector valve (42), a first sub-heat exchanger (43), an expansion valve (4V) as an expansion mechanism and a second sub-heat exchanger (44) are connected in this order, and forms a single refrigerating cycle reciprocally operable in a manner that sub-refrigerant is condensed in one of the sub-heat exchangers (43, 44) and is evaporated in the other sub-heat exchanger (43, 44).

Both the sub-heat exchangers (43, 44) are connected to some midpoint in the liquid line (23-L) of the main refrigerant circuit (20) so as to be branched from the refrigerant pipe (23), and are connected in parallel with each other. In the liquid line (23-L), check valves (4C, 4C) are provided at an inlet side and an outlet side of each of the sub-heat exchangers (43, 44), respectively, thereby allowing flows of refrigerant from the indoor heat exchangers (22, 22, ...) to the heating heat exchanger (21-H). Both the sub-heat exchangers (43, 44) are configured such that during the heating operation when the indoor heat exchangers (22, 22, ...) become condensers, condensation and evaporation of sub-refrigerant are alternately executed and sub-refrigerant cools and heats liquid refrigerant of the main refrigerant circuit (20) to give a moving force to the liquid refrigerant.

The compressor (41) is connected at a suction side thereof to a suction heat exchanger (45). The suction heat exchanger (45) exchanges heat between sub-refrigerant and secondary refrigerant of the main refrigerant circuit (20) to adjust the superheated degree of the sub-refrigerant sucked into the compressor (41) and supercool secondary refrigerant of the main refrigerant circuit (20).

Principle of Sub-Refrigerating Machine (40)

Next, description is made about a basic principle of the sub-refrigerating machine (40).

First, secondary refrigerant in the main refrigerant circuit (20) increases its pressure with the increase in temperature or decreases its pressure with the decrease in temperature. With the use of this principle, heat energy of the sub-refrigerating machine (40) is converted to work for transferring secondary refrigerant.

More specifically, sub-refrigerant in the sub-refrigerating machine (40) repeatedly circulates in a manner to be discharged from the compressor (41), condense in one of the sub-heat exchangers (43, 44), expand in the expansion valve (4V), evaporate in the other sub-heat exchanger (43, 44) and return to the compressor (41). In the sub-heat exchanger (43, 44) which condenses sub-refrigerant, secondary refrigerant is heated to raise its pressure so that secondary liquid refrigerant stored in the sub-heat exchanger (43, 44) is discharged. As a result, the secondary refrigerant obtains a moving force.

On the other hand, in the sub-heat exchanger (43, 44) which evaporates sub-refrigerant, secondary refrigerant is cooled to lower its pressure so that secondary liquid refrigerant flows into the sub-heat exchanger (43, 44). The discharge and inflow of secondary liquid refrigerant are alternately repeated between both the sub-heat exchangers (43, 44) so that secondary refrigerant substantially continues to be transferred.

Since the compressor (41) of the sub-refrigerating machine (40) has only functions of heating and cooling secondary refrigerant of the main refrigerant circuit (20), it has a capacity as small as about 20% of that of the compressor of the chilling unit (30-R) as a main refrigerating machine, though it is not shown.

Operations of Embodiment 1

Operations of the above-mentioned air conditioner (10) are described next. The air conditioner (10) of this embodiment can operate in the following seven types of operation modes: (a) an ice-producing heat storage operation mode; (b) an ice-producing heat storage and cooling operation mode; (c) an ice-producing heat storage and heating operation mode; (d) an ice-producing heat storage and hot water-producing heat storage operation mode; (e) a hot water-producing heat storage operation mode; (f) a hot water-producing heat storage and heating operation mode; and (g) a hot water-producing heat storage and cooling operation mode.

The ice-producing heat storage operation mode shown in (a) is mainly executed at the midnight. First, the chilling unit (30-R) and the circulation pump (P2-C) of the low temperature heat water circuit (30-C) are driven so that low temperature heat water is cooled in the chilling unit (30-R) and ice thus obtained is stored in the heat storage tank (3T-C) of the low temperature heat water circuit (30-C).

The hot water-producing heat storage operation mode shown in (e) is also mainly executed at the midnight. First, the chilling unit (30-R) and the circulation pump (P2-H) of the high temperature heat water circuit (30-H) are driven so that high temperature heat water is heated in the chilling unit (30-R) and hot water thus obtained is stored in the heat storage tank (3T-H) of the high temperature heat water circuit (30-H).

In the ice-producing heat storage and hot water-producing heat storage operation mode shown in (d), the above-mentioned ice-producing heat storage operation mode shown in (a) and the above-mentioned hot water-producing heat storage operation mode shown in (e) are concurrently executed.

In the ice-producing heat storage and cooling operation mode shown in (b) and the hot water-producing heat storage and cooling operation mode shown in (g), the cooling operation is concurrently executed together with the ice-producing heat storage operation in (a) and the hot water-producing heat storage operation in (e), respectively.

Here, the cooling operation will be described.

During the cooling operation, the operation of the sub-refrigerating machine (40) is stopped so that secondary refrigerant in the main refrigerant circuit (20) naturally circulates. At the time, the circulation pump (P1-H) of the high temperature heat water circuit (30-H) is stopped, whereas the circulation pump (P1-C) of the low temperature heat water circuit (30-C) is driven so that low temperature heat water is supplied to the cooling heat exchanger (21-C).

In this condition, as shown in a solid arrow in FIG. 1, secondary refrigerant in the main refrigerant circuit (20) exchanges heat with low temperature heat water in the cooling heat exchanger (21-C) to receive low temperature heat from the low temperature heat water thereby condensing into liquid refrigerant. Since the cooling heat exchanger (21-C) is placed at the rooftop, the secondary liquid refrigerant moves down due to the weight of itself to flow into the respective indoor heat exchangers (22, 22, . . . ).

More specifically, the secondary liquid refrigerant flowing out of the cooling heat exchanger (21-C) passes through the check valve (CV-1) and the solenoid valve (SV-1), reduces its pressure in the respective expansion valves (EV-A, EV-A, . . . ) and flows into the respective indoor heat exchangers (22, 22, . . . ). The secondary liquid refrigerant evaporates in the respective indoor heat exchangers (22, 22, . . . ) to change into secondary gas refrigerant thereby cooling respective rooms.

The secondary refrigerant expands its volume due to the change of state into gas refrigerant to move upward through a gas-side part of the refrigerant pipe (23), returns from the respective indoor heat exchangers (22, 22, . . . ) to the cooling heat exchanger (21-C) located at the rooftop, and receives low temperature heat from low temperature heat water to condense again. The cooling operation is executed in a manner that the secondary refrigerant repeats such an action.

In the ice-producing heat storage and heating operation mode shown in (c) and the hot water-producing heat storage and heating operation mode shown in (f), the heating operation is concurrently executed together with the ice-producing heat storage operation in (a) and the hot water-producing heat storage operation in (e), respectively.

Here, the heating operation will be described.

During the heating operation, since the heating heat exchanger (21-H) is placed at the rooftop, secondary refrigerant in the main refrigerant circuit (20) cannot naturally circulate. Therefore, as a feature of the invention, the sub-refrigerating machine (40) is driven so that the secondary refrigerant is circulated. In this case, the circulation pump (P1-C) of the low temperature heat water circuit (30-C) is stopped, whereas the circulation pump (P1-H) of the high temperature heat water circuit (30-H) is driven so that high temperature heat water is supplied to the heating heat exchanger (21-H).

In this condition, secondary refrigerant in the main refrigerant circuit (20) exchanges heat with high temperature heat water in the heating heat exchanger (21-H) to receive high temperature heat from the high temperature heat water thereby evaporating into gas refrigerant. As shown in dot-dash arrows in FIG. 1, the secondary refrigerant expands to flow into the respective indoor heat exchangers (22, 22, . . . ) through a gas-side part of the refrigerant pipe (23).

The secondary gas refrigerant condenses in the respective indoor heat exchangers (22, 22, . . . ) into secondary liquid refrigerant thereby heating respective rooms. Since the solenoid valve (SV-1) is closed, the secondary liquid refrigerant reduced in pressure in the respective expansion valves (EV-A, EV-A, . . . ) flows into the sub-heat exchangers (43, 44) of the sub-refrigerating machine (40). That is, since the secondary liquid refrigerant has no moving force of returning to the heating heat exchanger (21-H) by itself, it flows into the sub-heat exchangers (43, 44).

Since the sub-refrigerating machine (40) forms a single refrigerating cycle, sub-refrigerant repeatedly circulates in a manner to be discharged from the compressor (41), condense in one of the sub-heat exchangers (43, 44), expand in the expansion valve (4V), evaporate in the other sub-heat exchanger (43, 44) and return to the compressor (41). For example, when the first sub-heat exchanger (43) becomes a condenser and the second sub-heat exchanger (44) becomes an evaporator, secondary refrigerant is heated in the first sub-heat exchanger (43) to raise its pressure so that the secondary liquid refrigerant stored in the first sub-heat exchanger (43) is discharged. Namely, the secondary refrigerant obtains a moving force.

On the other hand, secondary refrigerant is cooled in the second sub-heat exchanger (44) to lower its pressure so that secondary liquid refrigerant flows into the second sub-heat exchanger (44). The above-mentioned discharge and inflow of secondary liquid refrigerant are alternately repeated between the sub-heat exchangers (43, 44) so that secondary liquid refrigerant substantially continues to move upward through the liquid line (23-L) and return to the heating heat exchanger (21-H). Then, the secondary liquid refrigerant receives hot heat from the high temperature heat water to evaporate again. In a manner of repeating such an action, the heating operation is executed.

The change in the direction of flow of the four-way selector valve (42) of the sub-refrigerating machine (40), i.e., the selection between condensation and evaporation in both the sub-heat exchangers (43, 44), is made as follows. For example, when the first sub-heat exchanger (43) heats secondary refrigerant so that all secondary liquid refrigerant flows out, the first-sub heat exchanger (43) is filled with secondary gas refrigerant. As a result, the heat exchange effectiveness between secondary liquid refrigerant and sub-refrigerant is decreased so that the discharge pressure of the compressor (41) is increased. When the discharge pressure reaches a specified value, the direction of flow of the four-way selector valve (42) is changed. Thereby, the second sub-heat exchanger (44) is turned to a condenser and the first sub-heat exchanger (43) is turned to an evaporator. Such an action is repeated.

In the cooling operation, the sub-refrigerating machine (40) is deactivated so that secondary refrigerant in the main refrigerant circuit (20) naturally circulates. In this case, since liquid refrigerant is stored in both the sub-heat exchangers (43, 44), the sub-refrigerating machine (40) is intermittently driven at specified time intervals so that liquid refrigerant stored in both the sub-heat exchangers (43, 44) is discharged.

Effects of Embodiment 1

According to Embodiment 1 as mentioned so far, since a force of transfer of secondary refrigerant of the main refrigerant circuit (20) is obtained by heat energy of the sub-refrigerating machine (40), the cooling and heating operations can be executed with the single main refrigerant circuit (20). This provides simplified piping system and further facilitates installation.

Further, since refrigerant is transferred by heat energy without the use of a pump or the like, refrigerant transfer can be executed with reliability under small power.

Furthermore, since the chilling unit (30-R) forming a large-sized main refrigerating machine can be placed only at a rooftop or the like, the maintenance of lubricating oil can be facilitated. This reduces failures due to oil discharge and the like thereby providing an increased reliability.

Further, since it is prevented that the chilling unit (30-R) is subjected to stress due to change in load in the room, this increases reliability. For example, even if secondary liquid refrigerant is returned from the indoor heat exchangers (22, 22, ... ) to the cooling heat exchanger (21-C) during the cooling operation, there is no need for consideration of an operation in wet condition and the like since the compressor (41) as required in the conventional refrigerating cycle is not required. This increases the reliability of the air conditioning operation.

Furthermore, since the low temperature heat water circuit (30-C) and the high temperature heat water circuit (30-H) are provided, heat storage can be made during the night or another time. This enables effective use of electric power.

Modification 1 of Embodiment 1

Figure 2:
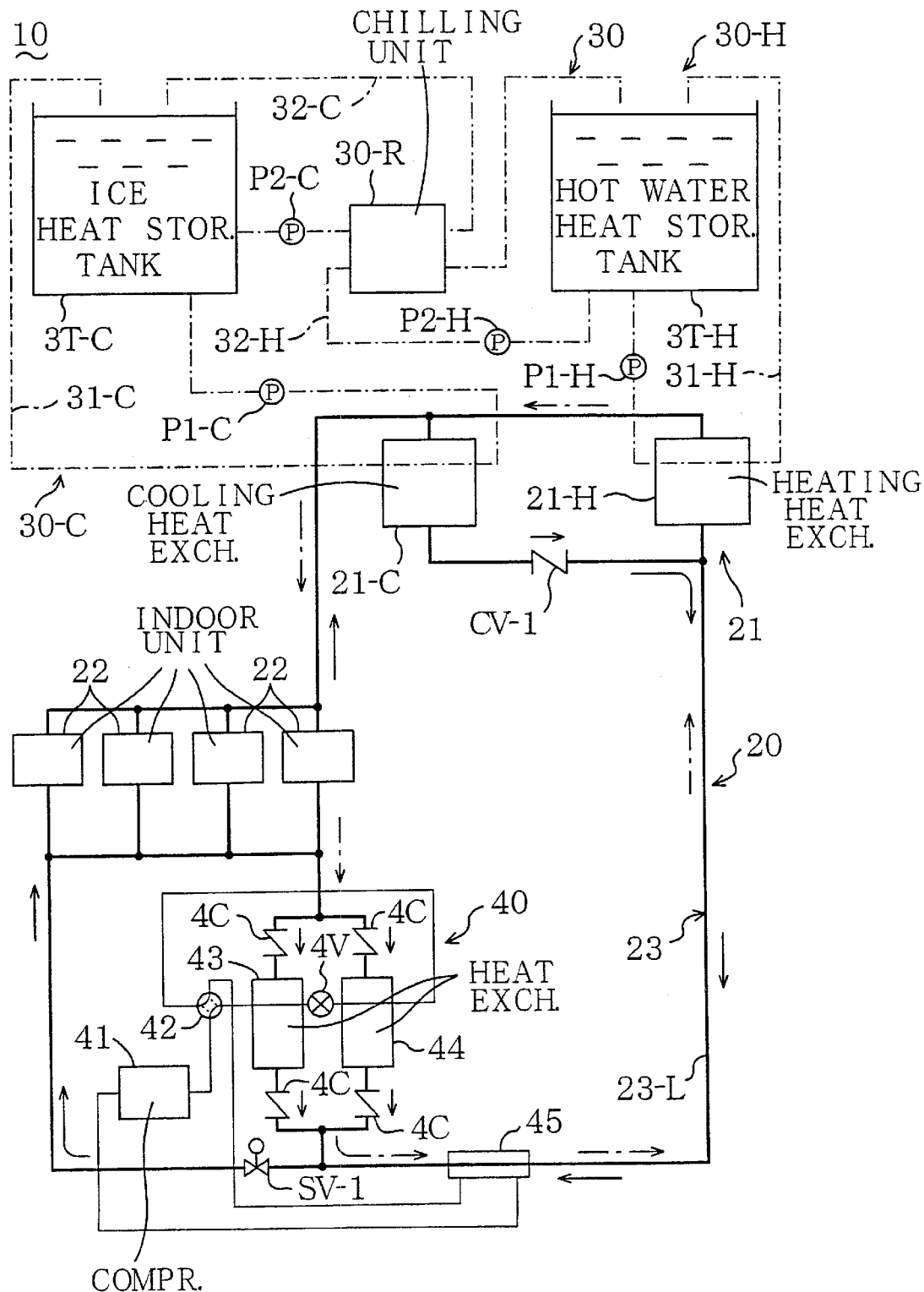
FIG. 2 is a refrigerant circuit diagram of an air conditioner according to Modification 1 of Embodiment 1 of the invention.

FIG. 2 shows a modification of the above-mentioned Embodiment 1, in which the expansion valves (EV-A, EV-A, ... ) of the main refrigerant circuit (20) are omitted.

Accordingly, the main refrigerant circuit (20) does not execute pressure reduction of secondary refrigerant during the cooling and heating operations. In detail, during the cooling operation, secondary liquid refrigerant flowing out of the cooling heat exchanger (21-C) moves down due to the weight of itself, passes through the check valve (CV-1) and the solenoid valve (SV-1), flows into the respective indoor heat exchangers (22, 22, ... ), and evaporates in the respective indoor heat exchangers (22, 22, ... ) thereby cooling the respective rooms.

During the heating operation, secondary gas refrigerant evaporated in the heating heat exchanger (21-H) flows into the respective indoor heat exchangers (22, 22, ... ) to condense into secondary liquid refrigerant thereby heating the respective rooms. The secondary liquid refrigerant directly flows into the sub-heat exchangers (43, 44) of the sub-refrigerating machine (40), obtains a moving force and then returns to the heating heat exchanger (21-H).

Modification 2 of Embodiment 1

Figure 3:
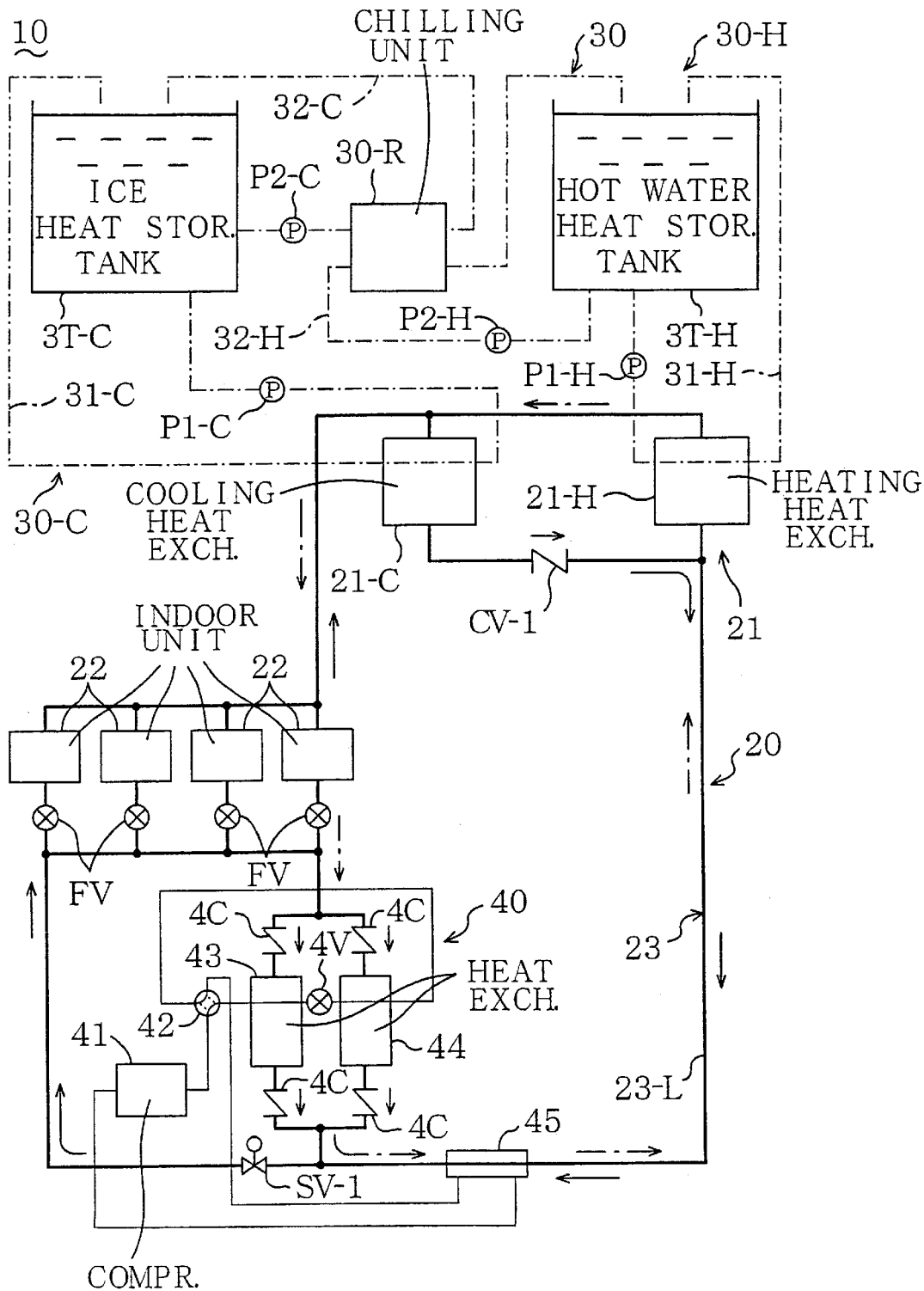
FIG. 3 is a refrigerant circuit diagram of an air conditioner according to Modification 2 of Embodiment 1 of the invention.

FIG. 3 shows another modification of the above-mentioned Embodiment 1, in which the main refrigerant circuit (20) is provided with flow rate control valves (FV, FV, ... ) as flow rate adjusting mechanisms instead of the expansion valves (EV-A, EV-A, ... ).

Thereby, the main refrigerant circuit (20) does not execute pressure reduction of secondary refrigerant during the cooling and heating operations but executes only adjustment of the flow rate of secondary refrigerant. In detail, during the cooling operation, secondary liquid refrigerant flowing out of the cooling heat exchanger (21-C) moves down due to the weight of itself, passes through the check valve (CV-1) and the solenoid valve (SV-1), and flows into the respective indoor heat exchangers (22, 22, ... ) through the respective flow rate control valves (FV, FV, ... ). At the time, the flow rate of the secondary liquid refrigerant is controlled by the flow rate control valves (FV, FV, ... ) and the secondary liquid refrigerant then evaporates in the respective indoor heat exchangers (22, 22, ... ) thereby cooling the respective rooms.

During the heating operation, secondary gas refrigerant evaporated in the heating heat exchanger (21-H) flows into the respective indoor heat exchangers (22, 22, ... ) to condense into secondary liquid refrigerant thereby heating the respective rooms. In this case, the flow rate of the secondary liquid refrigerant is controlled by the flow rate control valves (FV, FV, ... ), that is, the flow rate of secondary gas refrigerant flowing into the respective indoor heat exchangers (22, 22, ... ) is controlled. Thereafter, the secondary liquid refrigerant flows into the sub-heat exchangers (43, 44) of the sub-refrigerating machine (40) through the flow rate control valves (FV, FV, ... ), obtains a moving force therein and returns to the heating heat exchanger (21-H).

Another Modification of Embodiment 1

The expansion valves (EV-A, EV-A, ... ) of Embodiment 1 shown in FIG. 1 may have a function of the flow rate control valves (FV, FV, ... ) shown in FIG. 3, in addition to the function of reducing the pressure of secondary refrigerant.

Embodiment 2

Figure 4:
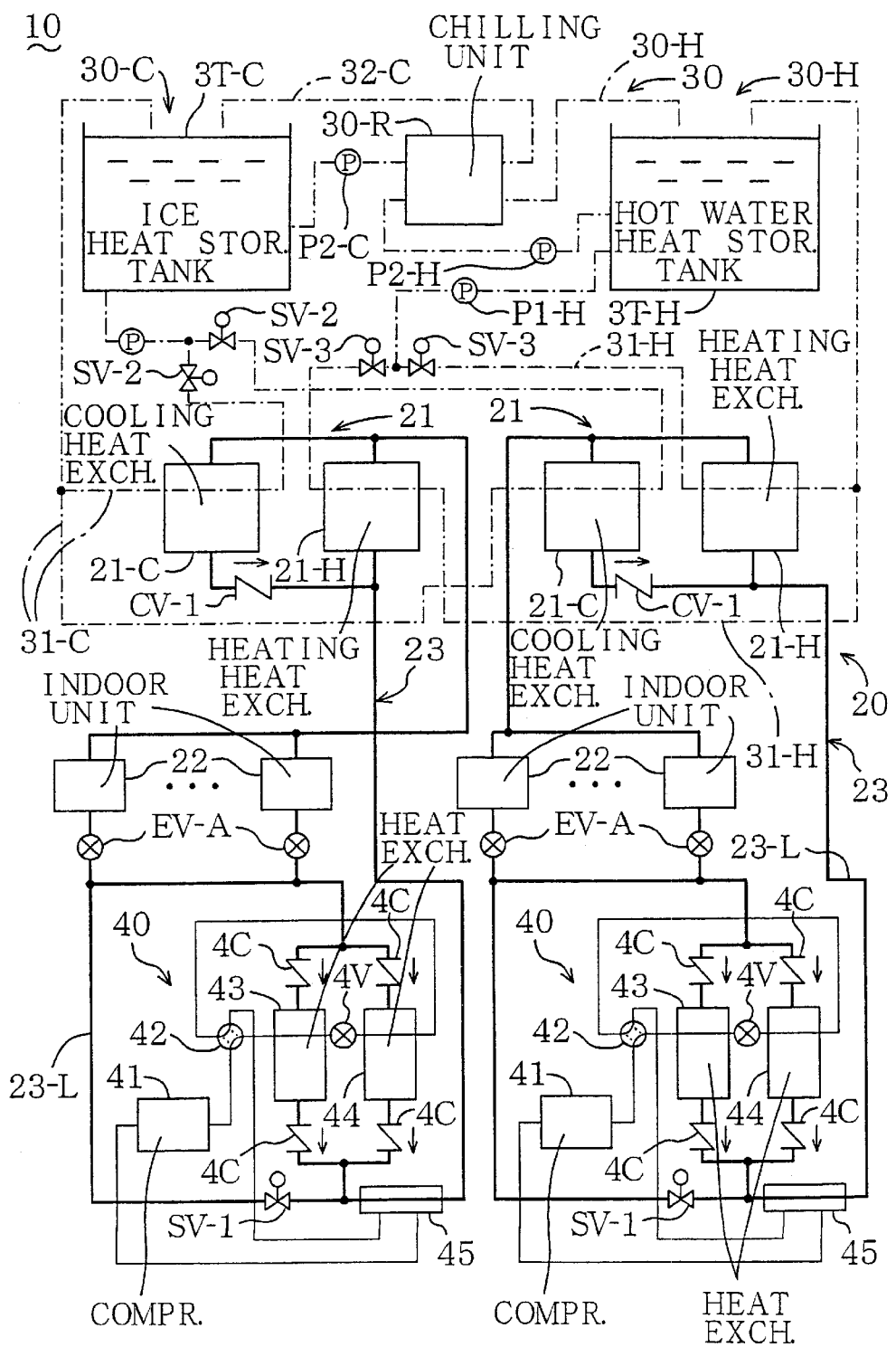
FIG. 4 is a refrigerant circuit diagram of an air conditioner according to Embodiment 2 of the invention.

As shown in FIG. 4, Embodiment 2 shows an embodiment of the thirteenth solution of the invention, in which two main refrigerant circuits (20, 20) are provided and two sub-refrigerating machines (40, 40) are provided in correspondence with the two main refrigerant circuits (20, 20).

More specifically, the low temperature heat water circuit (30-C) includes two circulation passages (31-C, 31-C). The circulation passages (31-C, 31-C) include solenoid valves (SV-2, SV-2), respectively, and are connected to cooling heat exchangers (21-C, 21-C) of the main refrigerant circuits (20, 20), respectively. A circulation pump (P1-C) is provided at a common part of both the circulation passages (31-C, 31-C).

The high temperature heat water circuit (30-H) includes two circulation passages (31-H, 31-H). The circulation passages (31-H, 31-H) include solenoid valves (SV-3, SV-3), respectively, and are connected to heating heat exchangers (21-H, 21-H) of the main refrigerant circuits (20, 20), respectively. A circulation pump (P1-H) is provided at a common part of both the circulation passages (31-H, 31-H).

Accordingly, in this Embodiment 2, the second main refrigerant circuit (20) can execute a heating operation in a condition that the first main refrigerant circuit (20) executes a cooling operation. On the contrary, the first main refrigerant circuit (20) can execute a heating operation in a condition that the second main refrigerant circuit (20) executes a cooling operation. As a result, the cooling and heating operations can be concurrently executed with respect to the plural indoor heat exchangers (22, 22, ... ).

The cooling operation by natural circulation of refrigerant and the heating operation with the use of the sub-refrigerating machine (40) are the same as in Embodiment 1. Further, three or more main refrigerant circuits (20) may be provided. Other structures, operations and effects are the same as in Embodiment 1.

Modifications of Embodiment 2

Also in Embodiment 2, the expansion valves (EV-A, EV-A, ... ) are provided in the main refrigerant circuit (20). However, as shown in FIG. 2 of Embodiment 1, the expansion valves (EV-A, EV-A, ... ) of the main refrigerant circuit (20) may be omitted. As shown in FIG. 3 of Embodiment 1, flow rate control valves (FV, FV, ... ) as flow rate adjusting mechanisms may be provided instead of the expansion valves (EV-A, EV-A, ... ). Alternatively, the expansion valves (EV-A, EV-A, ... ) may have the function of controlling the flow rate.

Embodiment 3

Figure 5:
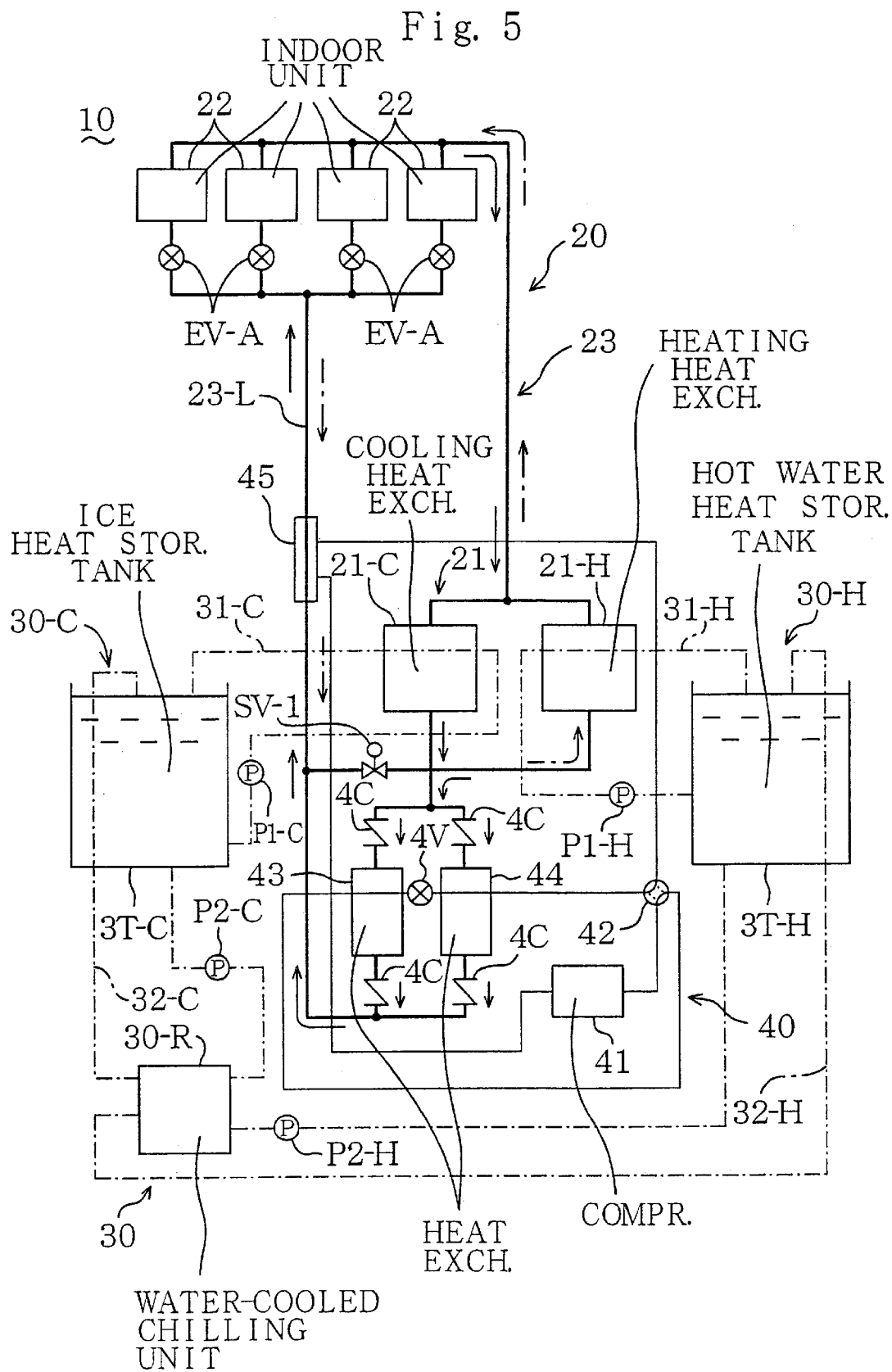
FIG. 5 is a refrigerant circuit diagram of an air conditioner according to Embodiment 3 of the invention.

As shown in FIG. 5, Embodiment 3 shows an embodiment of the fifth and twelfth solutions of the invention. Even though the low temperature heat water circuit (30-C), the high temperature heat water circuit (30-H) and the like are placed at the rooftop in Embodiment 1, they are placed underground instead.

More specifically, the cooling heat exchanger (21-C) and the heating heat exchanger (21-H) of the main refrigerant circuit (20) are provided underground, the low temperature heat water circuit (30-C) and the heat storage tank (3T-C) for high temperature heat water are provided underground, and a water-cooled chilling unit (30-R) and the sub-refrigerating machine (40) are provided underground.

In this Embodiment 3, since the cooling heat exchanger (21-C) and the heating heat exchanger (21-H) of the main refrigerant circuit (20) are placed underground, in contrast to Embodiment 1, secondary refrigerant naturally circulates in the main refrigerant circuit (20) during the heating operation and obtains a moving force by the sub-refrigerating machine (40) during the cooling operation.

In the main refrigerant circuit (20), the cooling heat exchanger (21-C) and both the sub-heat exchangers (43, 44) form a series circuit, the heating heat exchanger (21-H) and the solenoid valve (SV-1) form a series circuit, and both the series circuits are connected in parallel with each other. Thereby, the check valve (CV-1) of Embodiment 1 is omitted.

Cooling and Heating Operations

More specifically, during the heating operation, the operation of the sub-refrigerating machine (40) is stopped so that secondary refrigerant in the main refrigerant circuit (20) naturally circulates. First, as shown in dot-dash arrows in FIG. 5, secondary refrigerant in the main refrigerant circuit (20) exchanges heat with high temperature heat water in the heating heat exchanger (21-H) to receive high temperature heat from hot heat water thereby evaporating into gas refrigerant. The change of state of the secondary refrigerant into gas refrigerant expands the volume of the secondary refrigerant so that the secondary refrigerant moves upward through a gas-side part of the refrigerant pipe (23), flows into the respective indoor heat exchangers (22, 22, ... ), condenses in the respective indoor heat exchangers (22, 22, ... ) into secondary liquid refrigerant thereby heating the respective rooms.

Thereafter, the secondary liquid refrigerant expands in the respective expansion valves (EV-A, EV-A, ... ). Then, since the heating heat exchanger (21-H) is placed underground, the secondary liquid refrigerant moves downward due to the weight of itself and returns to the heating heat exchanger (21-H) through the solenoid valve (SV-1). Then, the secondary liquid refrigerant receives high temperature heat from heat water to evaporate again. In the manner of repeating such an action, the heating operation is executed.

On the other hand, during the cooling operation, secondary refrigerant in the main refrigerant circuit (20) cannot naturally circulate. Accordingly, as a feature of this invention, secondary refrigerant is circulated by driving the sub-refrigerating machine (40). First, secondary refrigerant in the main refrigerant circuit (20) exchanges heat with low temperature heat water in the cooling heat exchanger (21-C) to receive low temperature heat from the low temperature heat water thereby condensing into liquid refrigerant. Since the secondary liquid refrigerant has no force of moving toward the indoor heat exchangers (22, 22, ... ) located above, it flows into the sub-heat exchangers (43, 44) as shown in solid arrows in FIG. 5.

The sub-refrigerating machine (40) operates in the same manner as in Embodiment 1. In detail, sub-refrigerant repeatedly circulates in a manner to condense in one of the sub-heat exchangers (43, 44), expand in the expansion valve (4V), evaporate in the other sub-heat exchanger (43, 44) and return to the compressor (41). Accordingly, secondary refrigerant is heated in the sub-heat exchanger (43, 44) serving as a condenser to raise its pressure so that secondary liquid refrigerant stored therein is discharged thereby obtaining a moving force.

Further, secondary refrigerant is cooled in the sub-heat exchanger (43, 44) serving as an evaporator to lower its pressure so that secondary liquid refrigerant flows into the sub-heat exchanger (43, 44). The discharge and inflow of secondary liquid refrigerant are alternately repeated between both the sub-heat exchangers (43, 44) so that the secondary liquid refrigerant substantially continues to move upward through the liquid refrigerant pipe (23). Since the solenoid valve is closed, the secondary liquid refrigerant expands in the respective expansion valves (EV-A, EV-A, ... ) and then flows into the respective indoor heat exchangers (22, 22, ... ).

The secondary liquid refrigerant evaporates in the respective indoor heat exchangers (22, 22, ... ) to change into secondary gas refrigerant thereby cooling the respective rooms. The secondary gas refrigerant passes through a gas-side part of the refrigerant pipe (23) and then returns to the cooling heat exchanger (21-C). Then, the secondary gas refrigerant receives low temperature heat from low temperature heat water to condense again. In a manner of repeating such an action, the cooling operation is executed.

Other operation modes such as an ice-producing heat storage operation mode are the same as in Embodiment 1. Other structures, operations and effects are the same as in Embodiment 1.

Modifications of Embodiment 3

Also in Embodiment 3, the expansion valves (EV-A, EVA, . . . ) are provided in the main refrigerant circuit (20). However, as shown in FIG. 2 of Embodiment 1, the expansion valves (EV-A, EV-A, . . . ) of the main refrigerant circuit (20) may be omitted. As shown in FIG. 3 of Embodiment 1, flow rate control valves (FV, FV, . . . ) as flow rate adjusting mechanisms may be provided instead of the expansion valves (EV-A, EV-A, . . . ). Alternatively, the expansion valves (EV-A, EV-A, . . . ) may have the function of controlling the flow rate.

Embodiment 4

Figure 6:
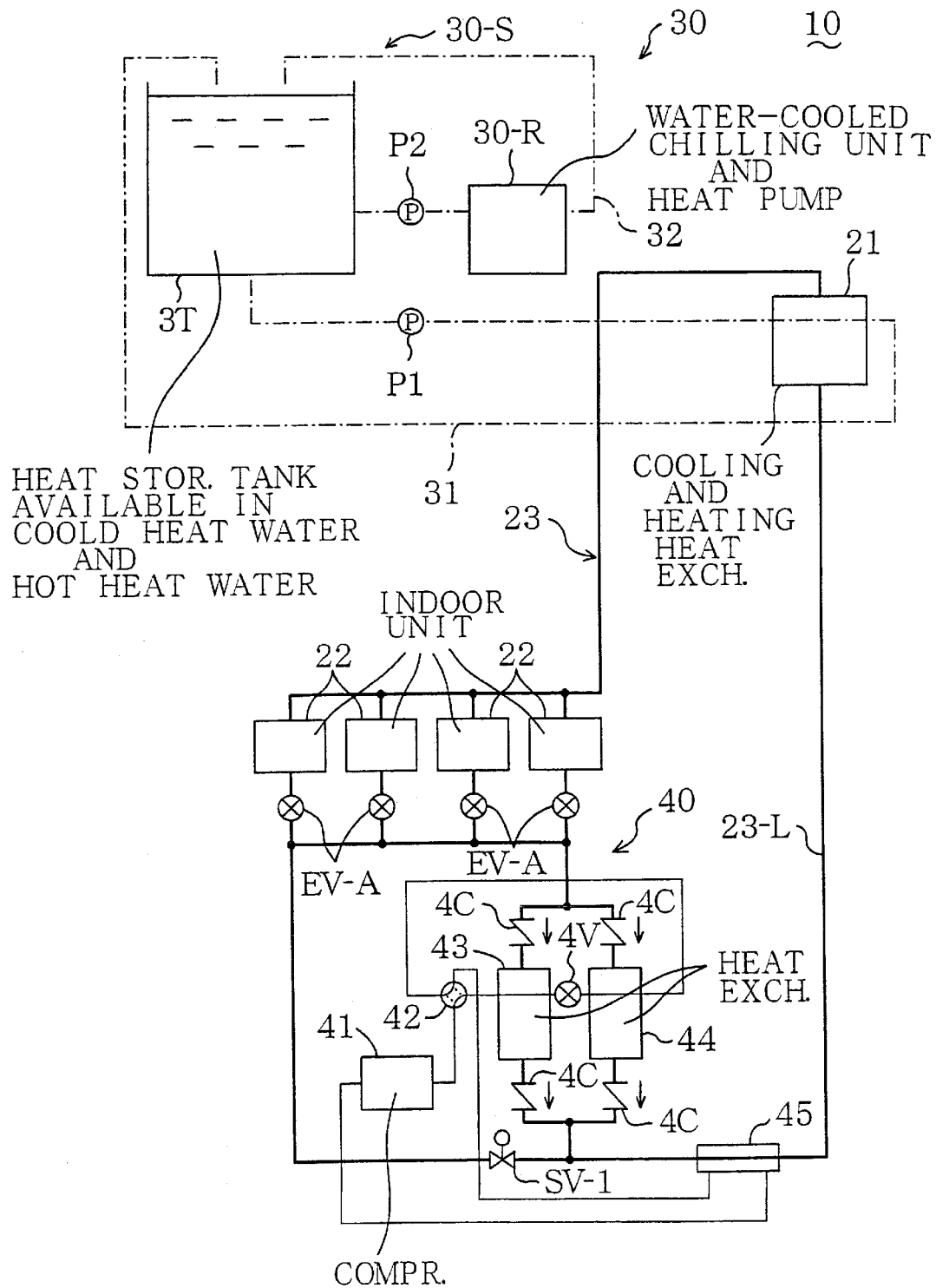
FIG. 6 is a refrigerant circuit diagram of an air conditioner according to Embodiment 4 of the invention.

As shown in FIG. 6, Embodiment 4 shows an embodiment of the fourth, eighth and eleventh solutions of the invention. Even though the low temperature heat water circuit (30-C) and the high temperature heat water circuit (30-H) are placed in Embodiment 1, a single heat source water circuit (30-S) for executing heat storage in the state of ice and heat storage in the state of hot water is placed at a rooftop instead.

The main refrigerant circuit (20) includes a single cooling and heating heat exchanger (21) as a heat source-side heat exchanger. A heat storage tank (3T) of the heat source water circuit (30-S) is connected to the cooling and heating heat exchanger (21) through a circulation passage (31) having a circulation pump (P1). A heat storage passage (32) having a circulation pump (P2) is connected to a water-cooled chilling unit (30-R) as a refrigerating means for heat source.

Accordingly, though Embodiment 1 can be operated in seven types of operation modes, Embodiment 4 can be operated in the following four types of operation modes: (a) the ice-producing heat storage operation mode; (b) the ice-producing heat storage and cooling operation mode; (e) the hot water-producing heat storage operation mode; and (f) the hot water-producing heat storage and heating operation mode.

The ice-producing heat storage operation mode shown in (a) and the hot water-producing heat storage operation mode shown in (e) are mainly executed during the midnight. First, when the chilling unit (30-R) and the circulation pump (P2) of the heat source water circuit (30-S) are driven, heat source water is cooled or heated in the chilling unit (30-R) so that ice or hot water is stored in the heat storage tank (3T) of the heat source water circuit (30-S).

The cooling operation and the heating operation are the same as in Embodiment 1. During the heating operation, the sub-refrigerating machine (40) is driven so that secondary refrigerant obtains a moving force. Other structures, operations and effects are the same as in Embodiment 1.

Modifications of Embodiment 4

Also in Embodiment 4, the expansion valves (EV-A, EV-A, . . . ) are provided in the main refrigerant circuit (20). However, as shown in FIG. 2 of Embodiment 1, the expansion valves (EV-A, EV-A, . . . ) of the main refrigerant circuit (20) may be omitted. As shown in FIG. 3 of Embodiment 1, flow rate control valves (FV, FV, . . . ) as flow rate adjusting mechanisms may be provided instead of the expansion valves (EV-A, EV-A, . . . ). Alternatively, the expansion valves (EV-A, EV-A, . . . ) may have the function of controlling the flow rate.

Embodiment 5

Figure 7:
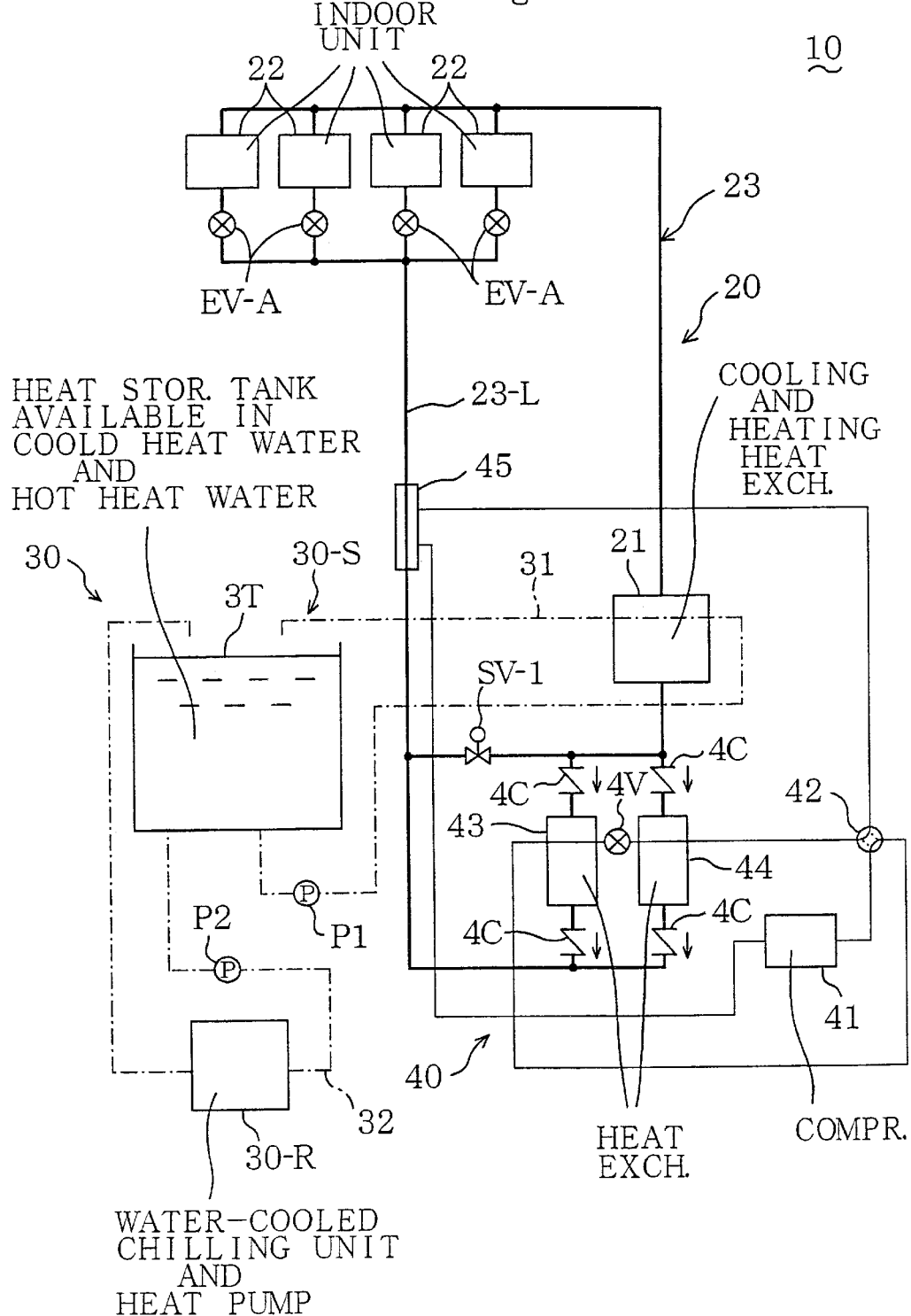
FIG. 7 is a refrigerant circuit diagram of an air conditioner according to Embodiment 5 of the invention.

As shown in FIG. 7, Embodiment 5 shows an embodiment of the fifth, eighth and twelfth solutions of the invention, in which a single heat source water circuit (30-S) is placed as in Embodiment 6 and the heat source water circuit (30-S) and the like are placed underground as in Embodiment 3.

Accordingly, Embodiment 5 can be operated in four types of operation modes as in Embodiment 4. Since the cooling and heating heat exchanger (21) is placed underground, during the cooling operation, the sub-refrigerating machine (40) is driven to apply a moving force to secondary refrigerant so that the secondary refrigerant is moved upward from the cooling and heating heat exchanger (21) to the respective indoor heat exchangers (22, 22, . . . ). Other structures, operations and effects are the same as in Embodiment 1.

Modifications of Embodiment 5

Also in Embodiment 5, the expansion valves (EV-A, EV-A, . . . ) are provided in the main refrigerant circuit (20). However, as shown in FIG. 2 of Embodiment 1, the expansion valves (EV-A, EV-A, . . . ) of the main refrigerant circuit (20) may be omitted. As shown in FIG. 3 of Embodiment 1, flow rate control valves (FV, FV, . . . ) as flow rate adjusting mechanisms may be provided instead of the expansion valves (EV-A, EV-A, . . . ). Alternatively, the expansion valves (EV-A, EV-A, . . . ) may have the function of controlling the flow rate.

Embodiment 6

Figure 8:
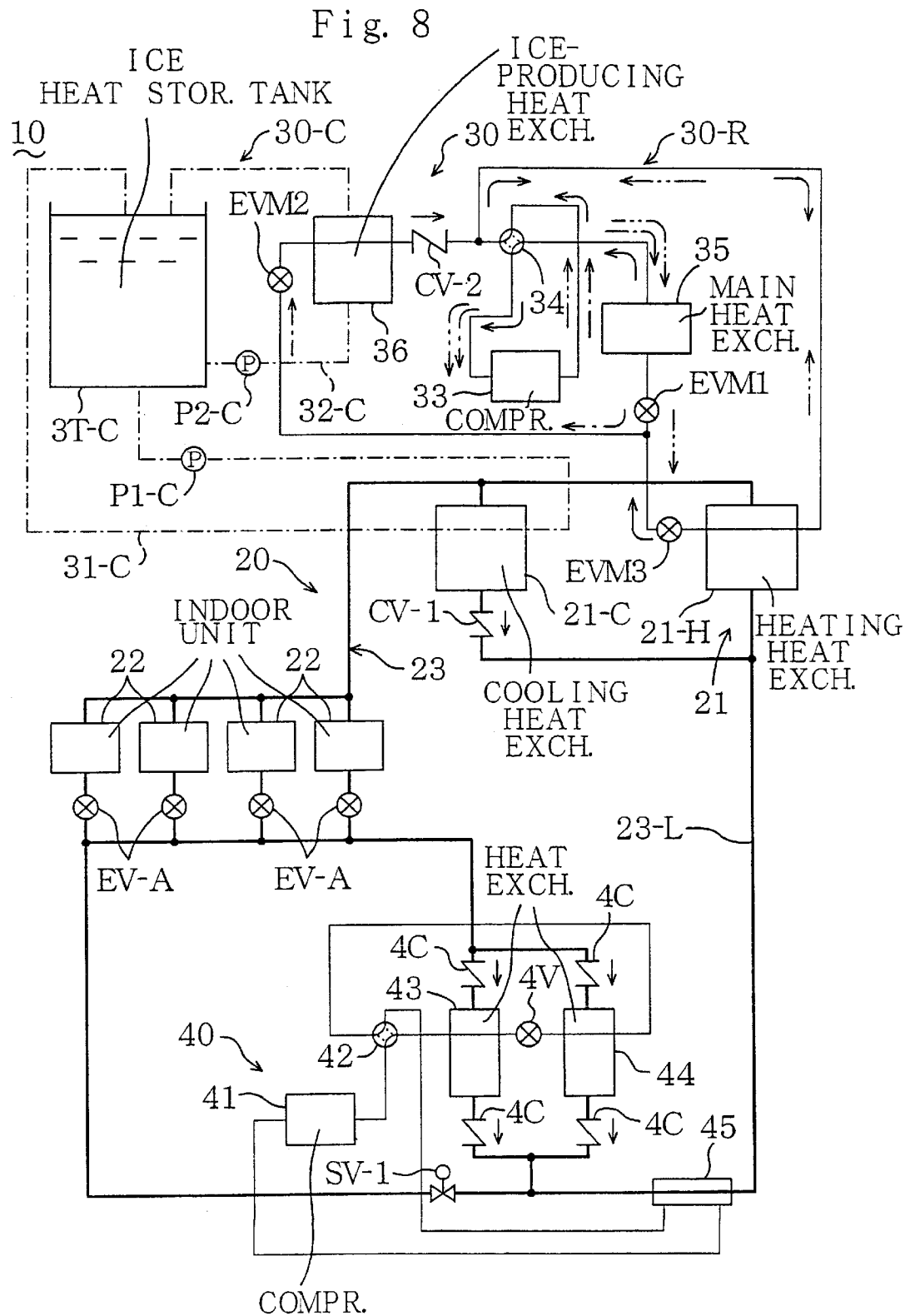
FIG. 8 is a refrigerant circuit diagram of an air conditioner according to Embodiment 6 of the invention.

As shown in FIG. 8, Embodiment 6 shows an embodiment of the fourth, ninth and eleventh solutions of the invention, in which the high temperature heat water circuit (30-H) and the chilling unit (30-R) of Embodiment 1 are substituted by a main refrigerating machine (30-R) as a single refrigerating means for heat source.

More specifically, the main refrigerating machine (30-R) form a single refrigerating cycle such that a compressor (33), a four-way selector valve (34), a main heat exchanger (35), an expansion valve (EVM1) for heating as an expansion mechanism, an expansion valve (EVM2) for ice production as an expansion mechanism and an ice-producing heat exchanger (36) as a heat exchanger for low temperature heat are connected in this order. The ice-producing heat exchanger (36) is connected to a heat storage passage (32-C) of a low temperature heat water circuit (30-C). A check valve (CV-2) is provided between the ice-producing heat exchanger (36) and the four-way selector valve (34) and is configured to allow refrigerant flow from the ice-producing heat exchanger (36) to the compressor (33).

The main refrigerating machine (30-R) is connected to a cooling and heating heat exchanger (21-H) of the main refrigerant circuit (20). The cooling and heating heat exchanger (21-H) is connected at one end thereof between the check valve (CV-2) and the four-way selector valve (34) and is connected at the other end between the expansion valve (EVM1) for heating and the expansion valve (EVM2) for ice production through an expansion valve (EVM3) for cooling. The main refrigerating machine (30-R) is configured to produce ice for low temperature heat in the ice-producing heat exchanger (36) and apply low temperature heat or high temperature heat to secondary refrigerant of the main refrigerant circuit (20) in the cooling and heating heat exchanger (21-H).

The main refrigerant circuit (20) has the same circuit configuration as in Embodiment 1 except that the heating heat exchanger of Embodiment 1 is substituted by the cooling and heating heat exchanger (21-H).

Operations and Effects of Embodiment 6

Next, operations of Embodiment 6 will be described. Though Embodiment 1 can operate in seven types of operation modes, Embodiment 6 is operable in five types of operation modes, i.e., (a) the ice-producing heat storage operation mode, (b) the ice-producing heat storage and cooling operation mode, (c) the ice-producing heat storage and heating operation mode, (h) a direct cooling operation mode and (i) a direct heating operation mode. Embodiment 6 is not operable in the ice-producing heat storage and hot water-producing heat storage operation mode shown in (d) of Embodiment 1, the hot water-producing heat storage operation mode shown in (e) of Embodiment 1, the hot water-producing heat storage and heating operation mode shown in (f) of Embodiment 1 and the hot water-producing heat storage and cooling operation mode shown in (g) of Embodiment 1.

Here, description is made about an operation of the main refrigerating machine (30-R) which is a feature of this Embodiment 6. In the ice-producing heat storage operation mode shown in (a), the expansion valve (EVM3) for cooling is fully closed and the four-way selector valve (34) is changed to a position shown in broken lines in FIG. 8. In this state, as shown in dot-dash lines in FIG. 8, refrigerant discharged from the compressor (33) condenses in the main heat exchanger (35), expands in the expansion valve (EVM2) for ice production, evaporates in the ice-producing heat exchanger (36) and returns to the compressor (33). The refrigerant repeats such a circulation. During the time, low temperature heat water is cooled in the ice-producing heat exchanger (36) so that heat is stored in the state of ice.

In the direct cooling operation mode shown in (h), the expansion valve (EVM2) for ice production is fully closed and the four-way selector valve (34) is changed to a position shown in broken lines in FIG. 8. In this state, as shown in two dot-dash lines in FIG. 8, refrigerant discharged from the compressor (33) condenses in the main heat exchanger (35), expands in the expansion valve (EVM3) for cooling, evaporates in the cooling and heating heat exchanger (21-H) and returns to the compressor (33). The refrigerant repeats such a circulation. During the time, the cooling and heating heat exchanger (21-H) cools secondary refrigerant of the main refrigerant circuit (20) to condense it thereby applying low temperature heat to it.

In the direct heating operation mode shown in (i), the expansion valve (EVM2) for ice production is fully closed and the four-way selector valve (34) is changed to a position shown in solid lines in FIG. 8. In this state, as shown in the solid lines in FIG. 8, refrigerant discharged from the compressor (33) condenses in the cooling and heating heat exchanger (21-H), expands in the expansion valve (EVM1) for heating, evaporates in the main heat exchanger (35) and returns to the compressor (33). The refrigerant repeats such a circulation. During the time, the cooling and heating heat exchanger (21-H) heats secondary refrigerant of the main refrigerant circuit (20) to evaporate it thereby applying high temperature heat to it.

Operations of the main refrigerant circuit (20) and the sub-refrigerating machine (40) are substantially the same as in Embodiment 1. That is, the cooling operation with the use of heat storage in the state of ice is the same as in Embodiment 1. In contrast to Embodiment 1, when ice for heat storage becomes lost, the main refrigerating machine operates in the above-mentioned operation mode shown in (h) to execute the cooling operation in a manner to cool secondary refrigerant in the cooling and heating heat exchanger (21-H) and naturally circulate the secondary refrigerant.

During the heating operation, the main refrigerating machine (30-R) is driven so that the cooling and heating heat exchanger (21-H) applies high temperature heat to secondary refrigerant of the main refrigerant circuit (20), while the sub-refrigerating machine (40) is driven to give a moving force to the secondary refrigerant thereby executing the heating operation.

Accordingly, Embodiment 6 can obtain the same effects as in Embodiment 1. Further, according to Embodiment 6, since the cooling operation can be executed with reliability even when ice for heat storage becomes short, this increases the reliability of the cooling operation. Other structures, operations and effects are the same as in Embodiment 1.

Modifications of Embodiment 6

Also in Embodiment 6, the expansion valves (EV-A, EVA-A, . . . ) are provided in the main refrigerant circuit (20). However, as shown in FIG. 2 of Embodiment 1, the expansion valves (EV-A, EV-A, . . . ) of the main refrigerant circuit (20) may be omitted. As shown in FIG. 3 of Embodiment 1, flow rate control valves (FV, FV, . . . ) as flow rate adjusting mechanisms may be provided instead of the expansion valves (EV-A, EV-A,. . . ). Alternatively, the expansion valves (EV-A, EV-A, . . . ) may have the function of controlling the flow rate.

Embodiment 7

Figure 9:
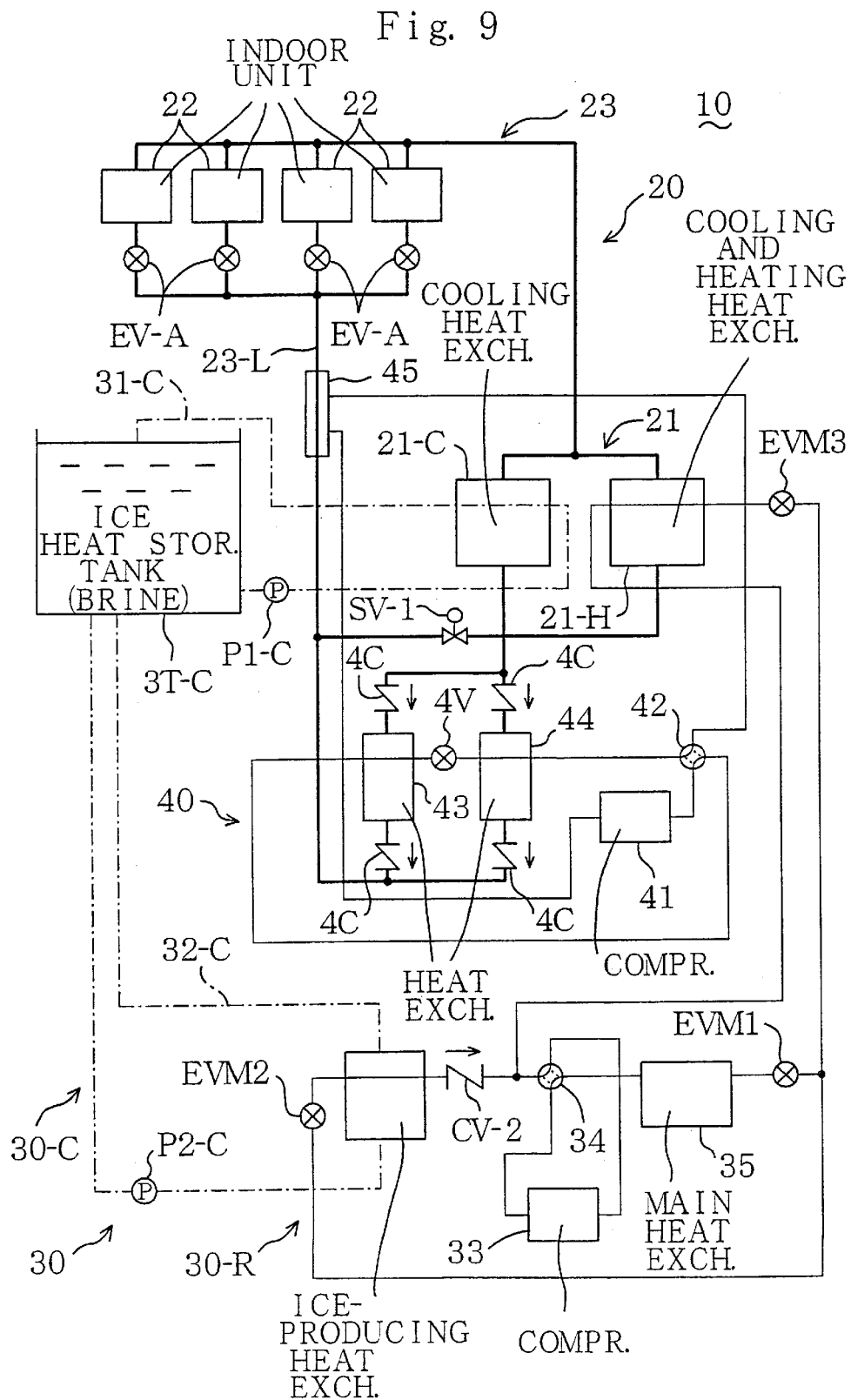
FIG. 9 is a refrigerant circuit diagram of an air conditioner according to Embodiment 7 of the invention.

As shown in FIG. 9, Embodiment 7 shows an embodiment of the fifth, ninth and twelfth solutions of the invention. Even though the low temperature heat water circuit (30-C), the main refrigerating machine (30-R) and the like are placed at the rooftop in Embodiment 6, they are placed underground instead. This embodiment corresponds to Embodiment 3.

As in embodiment 6, Embodiment 7 is also operable in five types of operation modes, i.e., (a) the ice-producing heat storage operation mode, (b) the ice-producing heat storage and cooling operation mode, (c) the ice-producing heat storage and heating operation mode, (h) the direct cooling operation mode and (i) the direct heating operation mode. The operations in the direct cooling operation mode and the direct heating operation mode are the same as in Embodiment 6.

However, the cooling heat exchanger (21-C) and the cooling and heating heat exchanger (21-H) are placed underground as in Embodiment 3. Accordingly, during the heating operation, secondary refrigerant in the main refrigerant circuit (20) naturally circulates. During the cooling operation, the sub-refrigerating machine (40) is driven so that secondary refrigerant in the main refrigerant circuit (20) obtains a moving force. Other structures, operations and effects are the same as in Embodiment 6.

Modifications of Embodiment 7

Also in Embodiment 7, the expansion valves (EV-A, EVA, . . . ) are provided in the main refrigerant circuit (20). However, as shown in FIG. 2 of Embodiment 1, the expansion valves (EV-A, EV-A, . . . ) of the main refrigerant circuit (20) may be omitted. As shown in FIG. 3 of Embodiment 1, flow rate control valves (FV, FV, . . . ) as flow rate adjusting mechanisms may be provided instead of the expansion valves (EV-A, EV-A, . . . ). Alternatively, the expansion valves (EV-A, EV-A, . . . ) may have the function of controlling the flow rate.

Embodiment 8

Figure 10:
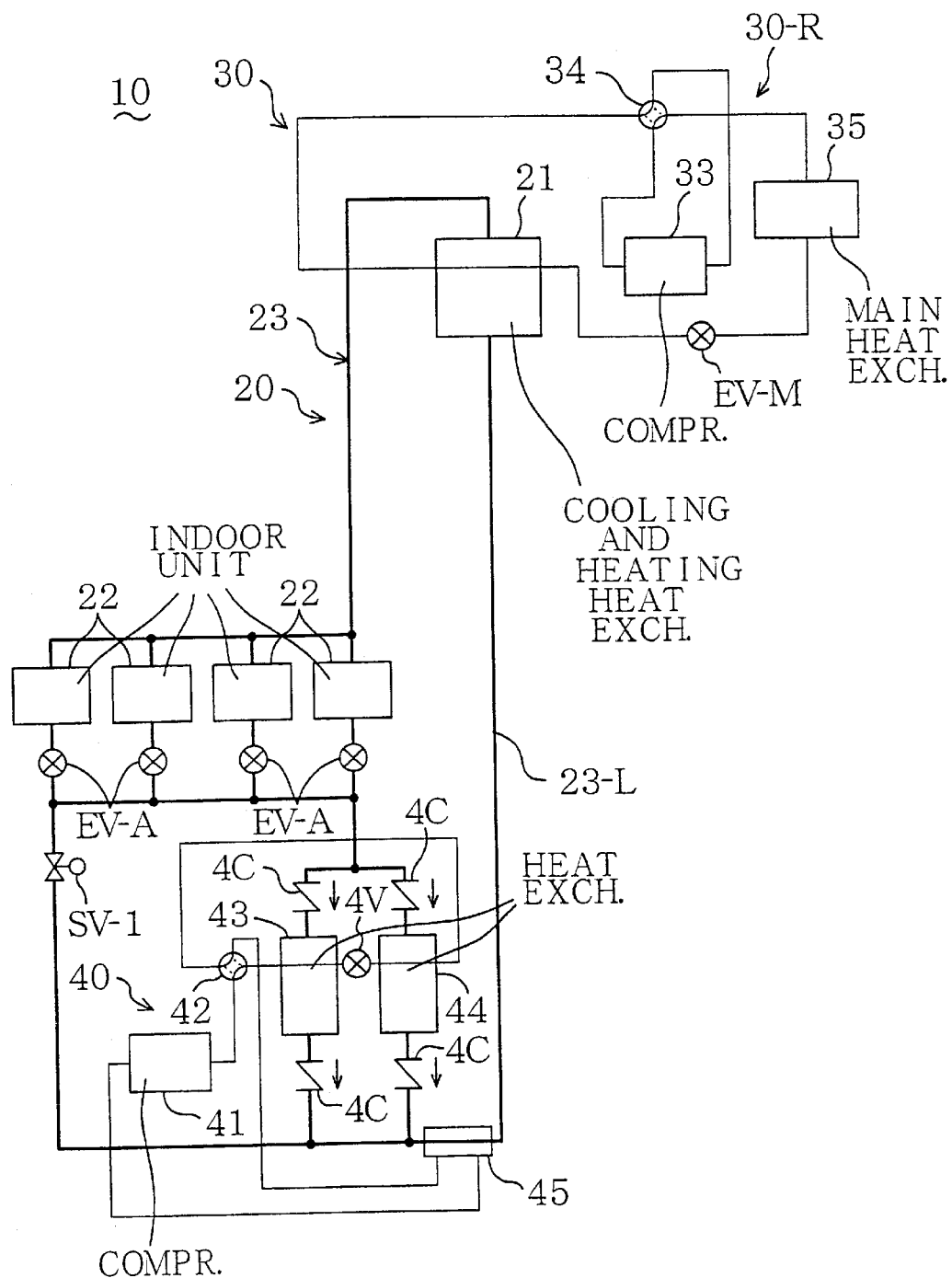
FIG. 10 is a refrigerant circuit diagram of an air conditioner according to Embodiment 8 of the invention.

As shown in FIG. 10, Embodiment 8 shows an embodiment of the fourth, tenth and eleventh solutions of the invention, in which a main refrigerating machine (30-R) as a single refrigerating means for heat source is provided instead of the low temperature heat water circuit (30-C) and the high temperature heat water circuit (30-H) of Embodiment 1. Further, the main refrigerant circuit (20) has a cooling and heating heat exchanger (21) as a single heat source-side heat exchanger.

The main refrigerating machine (30-R) includes a compressor (33), a four-way selector valve (34), a main heat exchanger (35) and an expansion valve (EV-M) and is connected to the cooling and heating heat exchanger (21) of the main refrigerant circuit (20).

Accordingly, Embodiment 8 is operable only in (h) the direct cooling operation mode and (i) the direct heating operation mode. In the main refrigerating machine (30-R) in the direct cooling operation mode, the four-way selector valve (34) is changed to a position shown in broken lines in FIG. 10. Refrigerant discharged from the compressor (33) condenses in the main heat exchanger (35), expands in the expansion valve (EV-M), evaporates in the cooling and heating heat exchanger (21) and returns to the compressor (33). The refrigerant repeats such a circulation. During the time, the cooling and heating heat exchanger (21) cools secondary refrigerant of the main refrigerant circuit (20) to condense it thereby applying low temperature heat to it.

In the main refrigerating machine (30-R) in the direct heating operation mode, the four-way selector valve (34) is changed to a position shown in solid lines in FIG. 10. Refrigerant discharged from the compressor (33) condenses in the cooling and heating heat exchanger (21), expands in the expansion valve (EV-M), evaporates in the main heat exchanger (35) and returns to the compressor (33). The refrigerant repeats such a circulation. During the time, the cooling and heating heat exchanger (21) heats secondary refrigerant of the main refrigerant circuit (20) to evaporate it thereby applying high temperature heat to it.

On the other hand, operations of the main refrigerant circuit (20) and the sub-refrigerating machine (40) are substantially the same as in Embodiment 1. During the cooling operation, in the operation mode shown in (h), the cooling and heating heat exchanger (21) cools secondary refrigerant to naturally circulate it thereby cooling the room.

During the heating operation, in the operation mode shown in (i), the cooling and heating heat exchanger (21) applies hot heat to secondary refrigerant of the main refrigerant circuit (20) while the sub-refrigerating machine (40) is driven so that a moving force is given to the secondary refrigerant thereby executing the heating operation. Other structures, operations and effects are the same as in Embodiment 1.

Modifications of Embodiment 8

Also in Embodiment 8, the expansion valves (EV-A, EVA, ...) are provided in the main refrigerant circuit (20). However, as shown in FIG. 2 of Embodiment 1, the expansion valves (EV-A, EV-A, ...) of the main refrigerant circuit (20) may be omitted. As shown in FIG. 3 of Embodiment 1, flow rate control valves (FV, FV, ...) as flow rate adjusting mechanisms may be provided instead of the expansion valves (EV-A, EV-A, ...). Alternatively, the expansion valves (EV-A, EV-A, ...) may have the function of controlling the flow rate.

Embodiment 9

Figure 11:
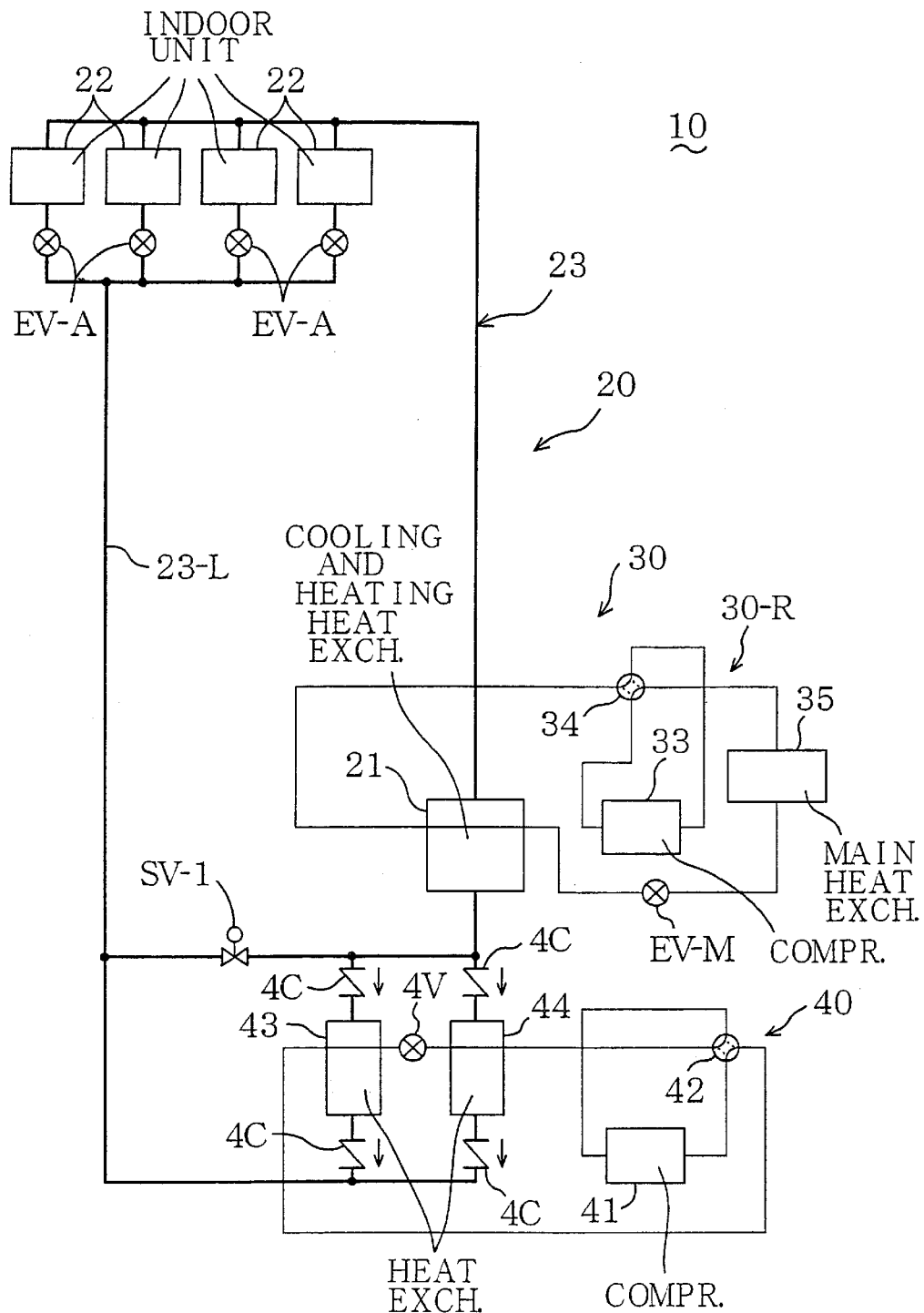
FIG. 11 is a refrigerant circuit diagram of an air conditioner according to Embodiment 9 of the invention.

As shown in FIG. 11, Embodiment 9 shows an embodiment of the fifth, tenth and twelfth solutions of the invention. Even though the main refrigerating machine (30-R) and the like are placed at the rooftop in Embodiment 8, they are placed underground instead. This embodiment corresponds to Embodiment 3. As in Embodiment 8, this Embodiment 9 is also operable only in the direct cooling operation mode shown in (h) and the direct heating operation mode shown in (i).

However, the cooling and heating heat exchanger (21) is placed underground as in Embodiment 3. Accordingly, during the heating operation, secondary refrigerant in the main refrigerant circuit (20) naturally circulates. During the cooling operation, the sub-refrigerating machine (40) is driven so that secondary refrigerant in the main refrigerant circuit (20) obtains a moving force. Other structures, operations and effects are the same as in Embodiment 8.

Modifications of Embodiment 9

Also in Embodiment 9, the expansion valves (EV-A, EVA, ...) are provided in the main refrigerant circuit (20). However, as shown in FIG. 2 of Embodiment 1, the expansion valves (EV-A, EV-A, ...) of the main refrigerant circuit (20) may be omitted. As shown in FIG. 3 of Embodiment 1, flow rate control valves (FV, FV, ...) as flow rate adjusting mechanisms may be provided instead of the expansion valves (EV-A, EV-A, ...). Alternatively, the expansion valves (EV-A, EV-A, ...) may have the function of controlling the flow rate.

Embodiment 10

Figure 12:
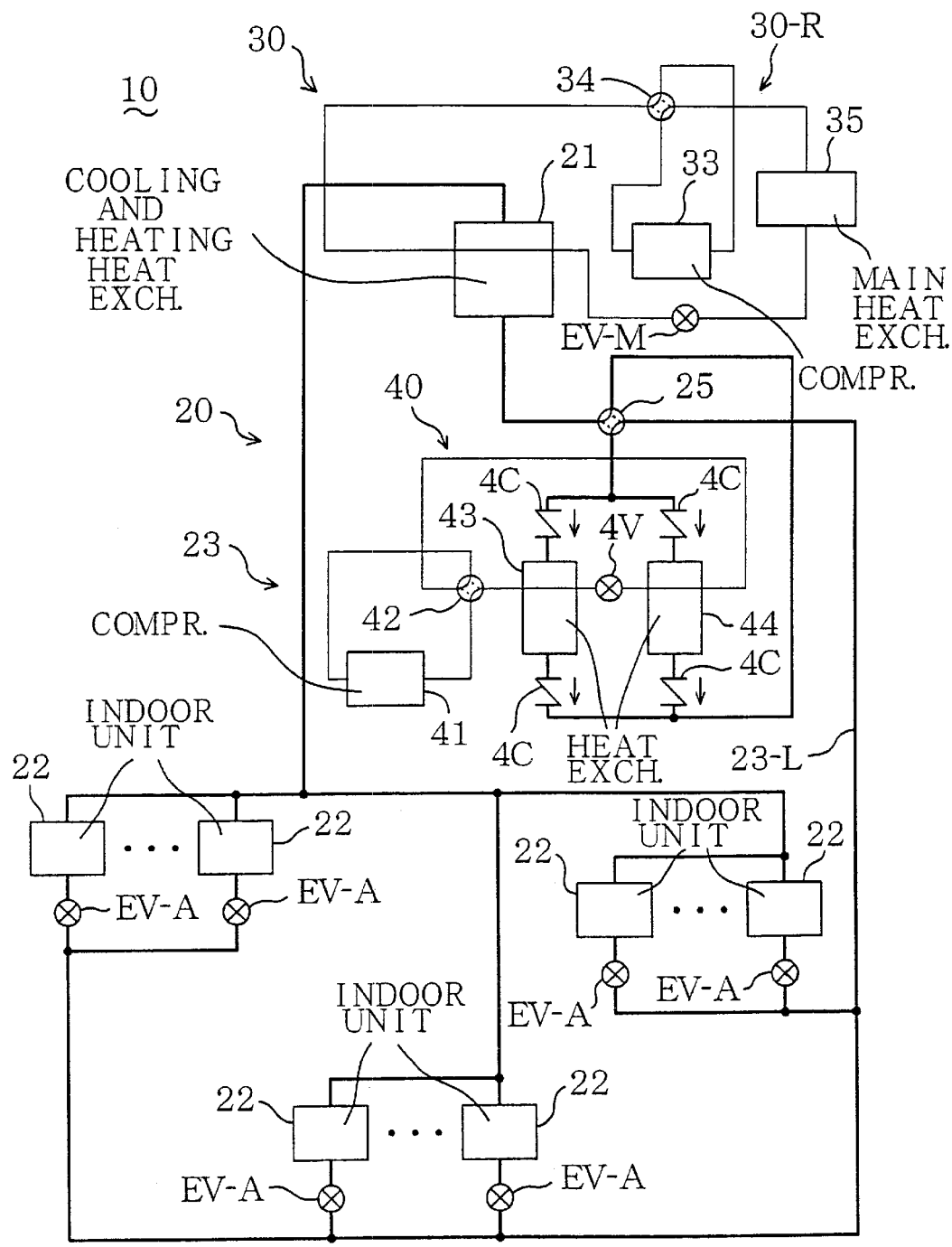
FIG. 12 is a refrigerant circuit diagram of an air conditioner according to Embodiment 10 of the invention.

As shown in FIG. 12, Embodiment 10 shows an embodiment of the fourteenth solution of the invention, in which as in Embodiment 8, the main refrigerant circuit (20) is provided with a cooling and heating heat exchanger (21) as a single heat source-side heat exchanger (21) and a main refrigerating machine (30-R) as a single refrigerating means for heat source.

The main refrigerant circuit (20) includes a four-way selector valve (34) and is configured to reciprocatably operate between a cooling cycle in which the cooling and heating heat exchanger (21) serves as a condenser and the indoor heat exchangers (22, 22, ...) serve as evaporators and a heating cycle in which the indoor heat exchangers (22, 22, ...) serve as condensers and the cooling and heating heat exchanger (21) serves as an evaporator. A four-way selector valve (25) of the main refrigerant circuit (20) and both the sub-heat exchangers (43, 44) of the sub-refrigerating machine (40) are provided in the liquid line (23-L).

Operations and Effects of Embodiment 10

As in Embodiment 8, Embodiment 10 is operable only in (h) the direct cooling operation mode and (i) the direct heating operation mode. In the main refrigerating machine (30-R) in the direct cooling operation mode shown in (h), the four-way selector valve (34) is changed to a position shown in solid lines in FIG. 12 so that refrigerant discharged from the compressor (33) condenses in the main heat exchanger (35), expands in the expansion valve (EV-M), evaporates in the cooling and heating heat exchanger (21) and returns to the compressor (33). The refrigerant repeats such a circulation.

In the main refrigerating machine (30-R) in the direct heating operation mode shown in (i), the four-way selector valve (34) is changed to a position shown in broken lines in FIG. 12 so that refrigerant discharged from the compressor (33) condenses in the cooling and heating heat exchanger (21), expands in the expansion valve (EV-N), evaporates in the main heat exchanger (35), and returns to the compressor (33). The refrigerant repeats such a circulation.

On the other hand, the sub-refrigerating machine (40) is driven during either of the cooling operation and the heating operation so that sub-refrigerant repeatedly circulates in a manner to condense in one of the sub-heat exchangers (43, 44) and evaporate in the other sub-heat exchanger (43, 44).

Further, in the direct cooling operation mode shown in (h), the four-way selector valve (25) is changed to a position shown in broken lines in FIG. 12 so that secondary refrigerant in the main refrigerant circuit (20) receives low temperature heat from the main refrigerating machine (30-R) in the cooling and heating heat exchanger (21) to liquefy therein and flows into the sub-heat exchanger (43, 44) serving as an evaporator. On the other hand, secondary refrigerant in the sub-heat exchanger (43, 44) serving as a condenser is heated to raise its pressure. As a result, the secondary refrigerant obtains a moving force to flow out of the sub-heat exchanger (43, 44). Then, the secondary liquid refrigerant is reduced in pressure in the respective indoor expansion valves (EV-A, EV-A, . . . ), evaporates in the respective indoor heat exchangers (22, 22, . . . ) to turn into gas refrigerant thereby cooling the respective rooms, and then returns to the cooling and heating heat exchanger (21). The secondary refrigerant repeats such a circulation.

In the direct heating operation mode shown in (i), the four-way selector valve (34) is changed to a position shown in solid lines in FIG. 12 so that secondary refrigerant in the main refrigerant circuit (20) receives high temperature heat from the main refrigerating machine (30-R) in the cooling and heating heat exchanger (21) to turn into gas refrigerant. The secondary gas refrigerant condenses in the respective indoor heat exchangers (22, 22, . . . ) to liquefy thereby heating the respective rooms, is reduced in pressure in the respective indoor expansion valves (EV-A, EV-A, . . . ), and flows into the sub-heat exchanger (43, 44) serving as an evaporator. On the other hand, secondary refrigerant in the sub-heat exchanger serving as a condenser is heated to raise its pressure. As a result, the secondary refrigerant obtains a moving force to flow out of the sub-heat exchanger (43, 44) and returns to the cooling and heating heat exchanger (21). The secondary refrigerant repeats such a circulation.

According to this Embodiment 10, since the cooling and heating heat exchanger (21) and the indoor heat exchangers (22, 22, . . . ) can be placed regardless of a level difference at which they are placed. This increases the flexibility of layout. Other structures, operations and effects are the same as in Embodiment 1.

Modifications of Embodiment 10

Also in Embodiment 10, the expansion valves (EV-A, EV-A, . . . ) are provided in the main refrigerant circuit (20). However, as shown in FIG. 2 of Embodiment 1, the expansion valves (EV-A, EV-A, . . . ) of the main refrigerant circuit (20) may be omitted. As shown in FIG. 3 of Embodiment 1, flow rate control valves (FV, FV, . . . ) as flow rate adjusting mechanisms may be provided instead of the expansion valves (EV-A, EV-A, . . . ). Alternatively, the expansion valves (EV-A, EV-A, . . . ) may have the function of controlling the flow rate.

Embodiment 11

Figure 13:
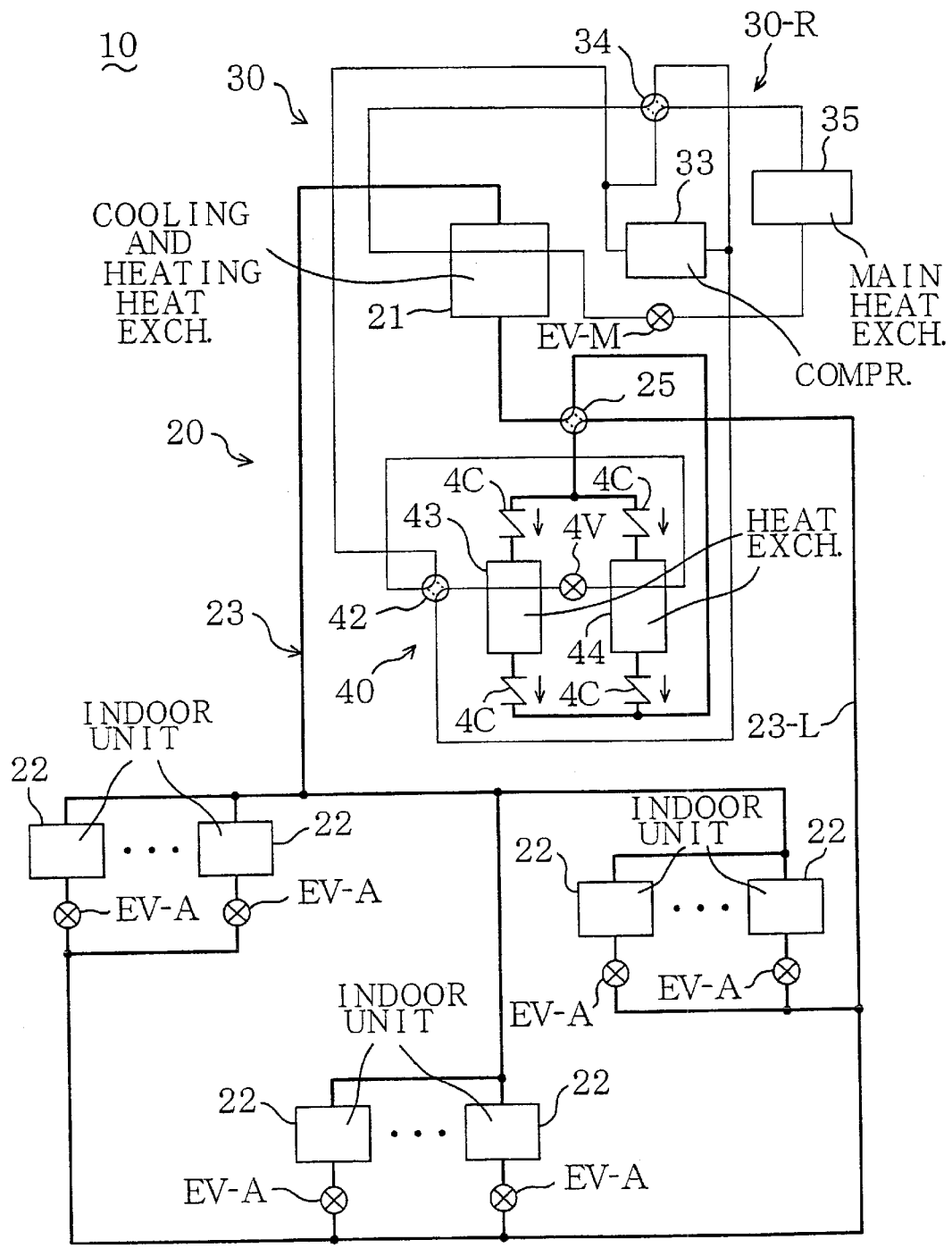
FIG. 13 is a refrigerant circuit diagram of an air conditioner according to Embodiment 11 of the invention.

As shown in FIG. 13, Embodiment 11 shows an embodiment of the fifteenth solution of the invention, in which the main refrigerant circuit (20) is provided with a cooling and heating heat exchanger (21) as a single heat source-side heat exchanger (21) and a main refrigerating machine (30-R) as a single refrigerating means for heat source as in Embodiment 10, and a compressor (33) of the main refrigerating machine (30-R) doubles as the compressor of the sub-refrigerating machine (40). In detail, two ports of a four-way selector valve (42) of the sub-refrigerating machine (40) are connected to discharge and suction sides of the compressor (33) of the main refrigerating machine (30-R), respectively.

According to this Embodiment 11, in the main refrigerating machine (30-R) in the direct cooling operation mode shown in (h), as in Embodiment 10, the four-way selector valve (34) is changed to a position shown in broken lines in FIG. 13 so that refrigerant circulates in a manner to be discharged from the compressor (33), condense in the main heat exchanger (35), expand in the expansion valve (EV-M), evaporate in the cooling and heating heat exchanger (21) and then return to the compressor (33). Concurrently, refrigerant discharged from the compressor (33) condenses and evaporates in the sub-heat exchangers (43, 44), respectively, and returns to the compressor (33). The refrigerant repeats such a circulation.

In the main refrigerating machine (30-R) in the direct heating operation mode shown in (i), as in Embodiment 10, the four-way selector valve (34) is changed to a position shown in solid lines in FIG. 13 so that refrigerant circulates in a manner to be discharged from the compressor (33), condense in the cooling and heating heat exchanger (21), expand in the expansion valve (EV-M), evaporate in the main heat exchanger (35), and then return to the compressor (33). Concurrently, refrigerant discharged from the compressor (33) condenses and evaporates in the sub-heat exchangers (43, 44), respectively, and returns to the compressor (33). The refrigerant repeats such a circulation.

Further, in the main refrigerant circuit (20), as in Embodiment 10, secondary refrigerant obtains a moving force in both the sub-heat exchangers (43, 44) to circulate between the cooling and heating heat exchanger (21) and the respective indoor heat exchangers (22, 22, . . . ) thereby cooling or heating the respective rooms.

As a result, in this Embodiment 11, a moving force as well as heat can be applied to secondary refrigerant with the single compressor (33). This decreases the number of elements thereby simplifying the configuration of the air conditioner. Other structures, operations and effects are the same as in Embodiment 10.

Modifications of Embodiment 11

Also in Embodiment 11, the expansion valves (EV-A, EV-A, . . . ) are provided in the main refrigerant circuit (20). However, as shown in FIG. 2 of Embodiment 1, the expansion valves (EV-A, EV-A, . . . ) of the main refrigerant circuit (20) may be omitted. As shown in FIG. 3 of Embodiment 1, flow rate control valves (FV, FV, . . . ) as flow rate adjusting mechanisms may be provided instead of the expansion valves (EV-A, EV-A, . . . ). Alternatively, the expansion valves (EV-A, EV-A, . . . ) may have the function of controlling the flow rate.

Embodiment 12

Figure 14:
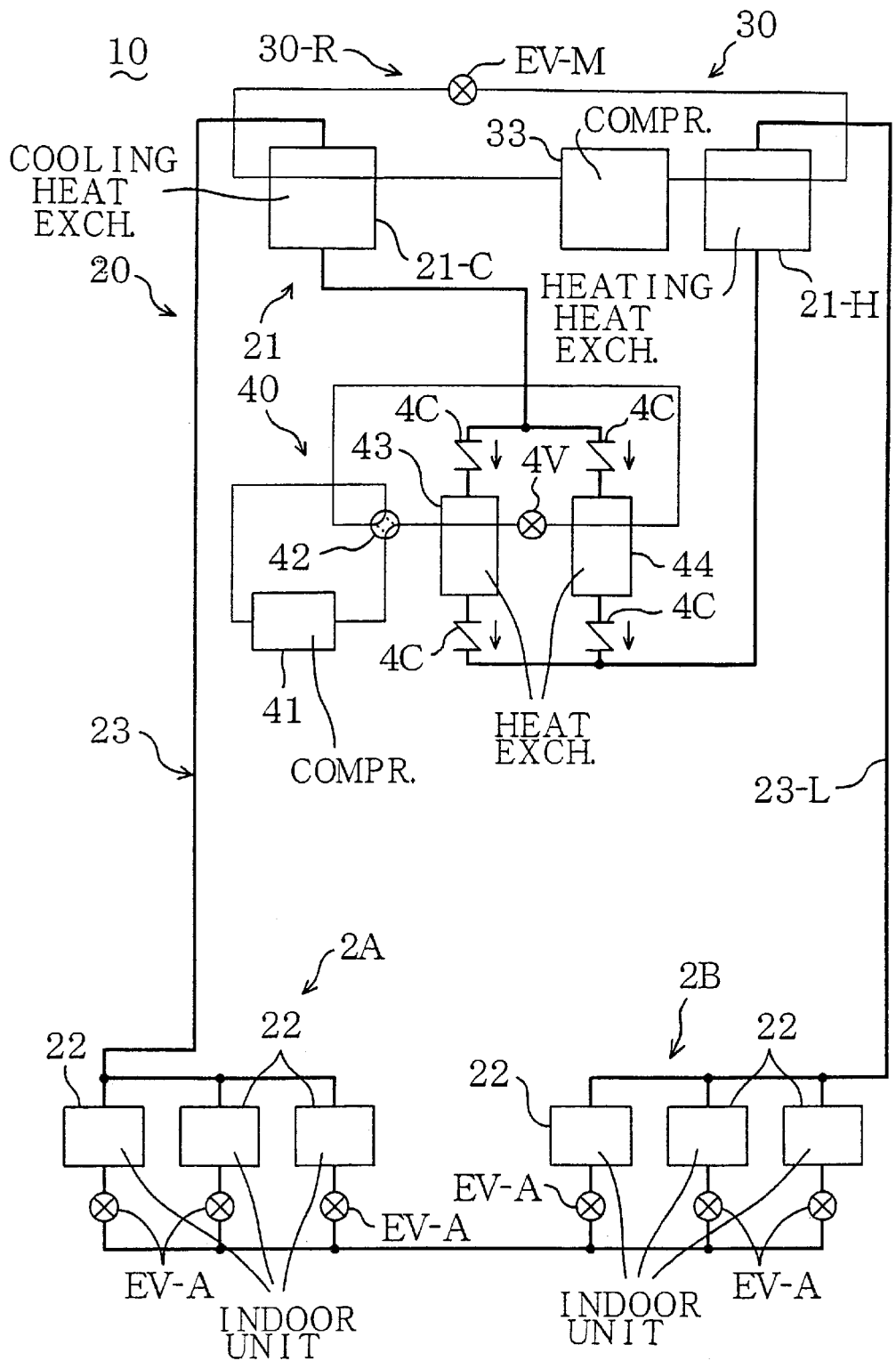
FIG. 14 is a refrigerant circuit diagram of an air conditioner according to Embodiment 12 of the invention.

As shown in FIG. 14, Embodiment 12 shows an embodiment of the sixteenth solution of the invention, in which the main refrigerant circuit (20) includes a first heat exchanger group (2A) and a second heat exchanger group (2B) as well as a cooling heat exchanger (21-C) and a heating heat exchanger (21-H).

More specifically, the main refrigerant circuit (20) is configured such that the cooling heat exchanger (21-C), the heating heat exchanger (21-H), the first heat exchanger group (2A) and the second heat exchanger group (2B) are connected in series. Two sub-heat exchangers (43,44) are provided between the cooling heat exchanger (21-C) and the heating heat exchanger (21-H).

Both the heat exchanger groups (2A, 2B) are each configured such that a plurality of indoor heat exchangers (22, 22, . . . ) are connected in parallel with each other. The indoor heat exchangers (22, 22, . . . ) are connected to indoor expansion valves (EV-A, EV-A, . . . ), respectively.

The main refrigerating machine (30-R) forms a single refrigerating cycle in a manner that a compressor (33), the heating heat exchanger (21-H), an expansion valve (EV-M) and the cooling heat exchanger (21-C) are connected in series.

Accordingly, in this Embodiment 12, only the direct heating operation and the direct cooling operation are concurrently executed. During the operation, refrigerant in the main refrigerating machine (30-R) condenses in the heating heat exchanger (21-H), expands in the expansion valve (EV-M), evaporates in the cooling heat exchanger (21-C) and then returns to the compressor (33). The refrigerant repeats such a circulation.

On the other hand, secondary refrigerant in the main refrigerant circuit (20) receives high temperature heat from the main refrigerating machine (30-R) in the heating heat exchanger (21-H) to evaporate into gas refrigerant, and flows into the respective indoor heat exchangers (22, 22, . . . ) of the second heat exchanger group (2B) to condense into liquid refrigerant thereby heating the respective rooms. Then, the secondary liquid refrigerant expands in the respective expansion valves (EV-A, EV-A, . . . ), evaporates in the respective indoor heat exchangers (22, 22, . . . ) of the first heat exchanger group (2A) to turn into gas refrigerant thereby cooling the respective rooms. The secondary gas refrigerant flows into the cooling heat exchanger (21-C), and receives low temperature heat from the main refrigerating machine (30-R) therein to condense into liquid refrigerant.

Subsequently, the secondary liquid refrigerant flows into the sub-heat exchanger (43, 44), serving as an evaporator, of the sub-refrigerating machine (40). Concurrently, secondary liquid refrigerant in the other sub-heat exchanger (43, 44) serving as a condenser is heated to raise its pressure thereby obtaining a moving force. The secondary liquid refrigerant obtaining the moving force flows out of the sub-heat exchanger (43, 44) and then returns to the heating heat exchanger (21-H). The secondary refrigerant repeats such a circulation.

Consequently, since heat discharged from the main refrigerant circuit (20) can be recovered by the main refrigerating machine (30-R), this increases efficiency. Other structures, operations and effects are the same as in Embodiment 8.

Modifications of Embodiment 12

Also in Embodiment 12, the expansion valves (EV-A, EV-A, . . . ) are provided in the main refrigerant circuit (20). However, as shown in FIG. 2 of Embodiment 1, the expansion valves (EV-A, EV-A, . . . ) of the main refrigerant circuit (20) may be omitted. As shown in FIG. 3 of Embodiment 1, flow rate control valves (FV, FV, . . . ) as flow rate adjusting mechanisms may be provided instead of the expansion valves (EV-A, EV-A, . . . ). Alternatively, the expansion valves (EV-A, EV-A, . . . ) may have the function of controlling the flow rate.

Other Embodiments of the Invention

In Embodiments 4 to 9 mentioned above, a single main refrigerating circuit (20) and a single sub-refrigerating circuit (40) are provided. However, as in Embodiment 2, a plurality of the main refrigerating circuits (20, 20) and a plurality of the sub-refrigerating machines (40, 40) may be provided.

In Embodiment 13, the first heat exchanger group (2A) executes the cooling operation and the second heat exchanger group (2B) executes the heating operation. However, the main refrigerating machine (30-R) may be provided with a four-way selector valve to reciprocatably operate between the cooling and heating operations so that the first heat exchanger group (2A) executes not only the cooling operation but also the heating operation and the second heat exchanger group (2B) executes not only the heating operation but also the cooling operation.

INDUSTRIAL APPLICABILITY

As mentioned so far, the air conditioner of this invention is useful as an air conditioner for transferring heat in a manner of circulating refrigerant without the use of a drive source such as a pump. Further, since the air conditioner of this invention provides simplified piping system, it is particularly suitable for air conditioning for large buildings.

I claim:
1. An air conditioner comprising:
a main refrigerant circuit which is formed in a manner that a heat source-side heat exchanger and a user-side heat exchanger are at least connected through a refrigerant pipe and in which refrigerant is circulated in a manner to be condensed in one of the heat exchangers and to be evaporated in the other heat exchanger;
heat source means for applying heat to refrigerant, in the heat source-side heat exchanger of the main refrigerant circuit; and
refrigerating means for refrigerant transfer which is formed such that a compressor, a first sub-heat exchanger, an expansion mechanism and a second sub-heat exchanger are connected in this order and forms a single refrigerating cycle reciprocally operable in a manner that sub-refrigerant is condensed in one of the sub-heat exchangers and is evaporated in the other sub-heat exchanger and in which both the sub-heat exchangers are connected to some midpoint in a liquid line of the main refrigerant circuit and the sub-refrigerant cools and heats liquid refrigerant of the main refrigerant circuit thereby giving a moving force to the liquid refrigerant wherein the heat source-side heat exchanger and the user-side heat exchanger of the main refrigerant circuit (20) are at least placed in a higher position and a lower position, respectively,
during a cooling operation, refrigerant in the main refrigerant circuit naturally circulates between the heat source-side heat exchanger and the user-side heat exchanger, and
during a heating operation, the refrigerating means for refrigerant transfer is driven so that the refrigerant in the main refrigerant circuit circulates between the heat source-side heat exchanger and the user-side heat exchanger.
2. An air conditioner according to claim 1, wherein
an expansion mechanism is provided at a part of the refrigerant pipe between the heat source-side heat exchanger and the user-side heat exchanger in the main refrigerant circuit.
3. An air conditioner according to claim 1, wherein
a flow rate adjusting mechanism for adjusting a flow rate of refrigerant is provided at a part of the refrigerant pipe between the heat source-side heat exchanger and the user-side heat exchanger in the main refrigerant circuit.
4. An air conditioner according to claim 1, wherein
the refrigerating means for refrigerant transfer heats liquid refrigerant of the main refrigerant circuit to discharge the liquid refrigerant from one of the sub-heat exchangers and cools refrigerant of the main refrigerant circuit to store liquid refrigerant in the other sub-heat exchangers.
5. An air conditioner according to claim 1, wherein
the heat source-side heat exchanger is composed of a low temperature heat source-side heat exchanger and a high temperature heat source-side heat exchanger, and
the heat source means is composed of:
a low temperature heat water circuit -C) for circulating low temperature heat water between a heat storage tank and the low temperature heat source-side heat exchanger so that the low temperature heat water stored in the heat storage tank is supplied to the low temperature heat source-side heat exchanger thereby applying low temperature heat to refrigerant in the low temperature heat source-side heat exchanger;

a high temperate heat water circuit for circulating high temperature heat water between a heat storage tank and the high temperature heat source-side heat exchanger so that the high temperate heat water stored in the heat storage tank is supplied to the high temperature heat source-side heat exchanger thereby applying high temperature heat to refrigerant in the high temperature heat source-side heat exchanger; and refrigerating means for heat source for cooling the low temperature heat water in the low temperature heat water circuit and heating the high temperature heat water in the high temperature heat water circuit to store heat in the low temperature heat water circuit and the high temperature heat water circuit, respectively.

6. An air conditioner according to claim 1, wherein the heat source-side heat exchanger is formed of a single heat exchanger, and the heat source means is composed of:
a heat source water circuit for circulating heat source water between a heat storage tank and the heat source-side heat exchanger so that the heat source water stored in the heat storage tank is supplied to the heat source-side heat exchanger thereby applying low temperature heat or high temperature heat to refrigerant in the heat source-side heat exchanger; and refrigerating means for heat source for cooling or heating the heat source water in the heat source water circuit to store heat in heat source water.

7. An air conditioner according to claim 1, wherein the heat source-side heat exchanger is formed of a single heat exchanger, and the heat source means is composed of refrigerating means for heat source which includes a compressor, a main heat exchanger and an expansion mechanism, is connected to the heat source-side heat exchanger and applies low temperature heat or high temperature heat to refrigerant of the main refrigerant circuit in the heat source-side heat exchanger.

8. An air conditioner according to claim 1, wherein a plurality of the main refrigerant circuits are provided and a plurality of the refrigerating means for refrigerant transfer are provided in correspondence with the main refrigerant circuits.

9. An air conditioner according to claim 1, wherein the heat source-side heat exchanger of the main refrigerant circuit is composed of a low temperature heat source-side heat exchanger and a high temperature heat source-side heat exchanger and the main refrigerant circuit includes a plurality of the user-side heat exchangers and circulates refrigerant in a manner that refrigerant is condensed in at least one of the user-side heat exchangers and is evaporated in the other user-side heat exchangers, the heat source means is composed of refrigerating means for heat source in which a compressor, a high temperature heat source-side heat exchanger, an expansion mechanism and a low temperature heat source-side heat exchanger are connected and which evaporates refrigerant of the main refrigerant circuit in the high temperature heat source-side heat exchanger and condenses refrigerant of the main refrigerant circuit in the low temperature heat source-side heat exchanger, and both the sub-heat exchangers of the refrigerating means for refrigerant transfer are connected to some midpoint in the liquid line between the low temperature heat source-side heat exchanger and the high temperature heat source-side heat exchanger of the main refrigerant circuit.

10. An air conditioner comprising:
a main refrigerant circuit which is formed in a manner that a heat source-side heat exchanger and a user-side heat exchanger are at least connected through a refrigerant pipe and in which refrigerant is circulated in a manner to be condensed in one of the heat exchangers and to be evaporated in the other heat exchanger;

heat source means for applying heat to refrigerant, in the heat source-side heat exchanger of the main refrigerant circuit; and refrigerating means for refrigerant transfer which is formed in a manner that a compressor, a first sub-heat exchanger, an expansion mechanism and a second sub-heat exchanger are connected in this order and forms a single refrigerating cycle reciprocally operable in a manner that sub-refrigerant is condensed in one of the sub-heat exchangers and is evaporated in the other sub-heat exchanger and in which both the sub-heat exchangers are connected to some midpoint in a liquid line of the main refrigerant circuit and the sub-refrigerant cools and heats liquid refrigerant of the main refrigerant circuit thereby giving a moving force to the liquid refrigerant, wherein the user-side heat exchanger and the heat source-side heat exchanger of the main refrigerant circuit are at least placed in a higher position and a lower position, respectively, during a heating operation, refrigerant in the main refrigerant circuit naturally circulates between the heat source-side heat exchanger and the user-side heat exchanger, and during a cooling operation, the refrigerating means for refrigerant transfer is driven so that the refrigerant in the main refrigerant circuit circulates between the heat source-side heat exchanger and the user-side heat exchanger.

11. An air conditioner according to claim 10, wherein an expansion mechanism is provided at a part of the refrigerant pipe between the heat source-side heat exchanger and the user-side heat exchanger in the refrigerant circuit (20).

12. An air conditioner according to claim 10, wherein a flow rate adjusting mechanism for adjusting a flow rate of refrigerant is provided at a part of the refrigerant pipe between the heat source-side heat exchanger and the user-side heat exchanger in the main refrigerant circuit.

13. An air conditioner according to claim 10, wherein the refrigerating means for refrigerant transfer heats liquid refrigerant of the main refrigerant circuit to discharge the liquid refrigerant from one of the sub-heat exchangers and cools refrigerant of the main refrigerant circuit to store liquid refrigerant in the other sub-heat exchangers.

14. An air conditioner according to claim 10, wherein the heat source-side heat exchanger is composed of a low temperature heat source-side heat exchanger and a high temperate heat source-side heat exchanger, and the heat source means is composed of:
a low temperature heat water circuit for circulating low temperature heat water between a heat storage tank and the low temperature heat source-side heat exchanger so that the low temperature heat water stored in the heat storage tank is supplied to the low temperature heat source-side heat exchanger thereby applying low temperature heat to refrigerant in the low temperature heat source-side heat exchanger;

a high temperature heat water circuit for circulating high temperature heat water between a heat storage tank and the high temperature heat source-side heat exchanger so that the high temperature heat water stored in the heat storage tank is supplied to the high temperature heat source-side heat exchanger thereby applying high temperature heat to refrigerant in the high temperature heat source-side heat exchanger; and refrigerating means for heat source for cooling the low temperature heat water in the low temperature heat water circuit and heating the high temperature heat water in the high temperature heat water circuit to store heat in the low temperature heat water circuit and the high temperature heat water circuit, respectively.

15. An air conditioner according to claim 10, wherein the heat source-side heat exchanger is formed of a single heat exchanger, and the heat source means is composed of:
a heat source water circuit for circulating heat source water between a heat storage tank and the heat source-side heat exchanger so that the heat source water stored in the heat storage tank is supplied to the heat source-side heat exchanger thereby applying low temperature heat or high temperature heat to refrigerant in the heat source-side heat exchanger; and refrigerating means for heat source for cooling or heating the heat source water in the heat source water circuit to store heat in heat source water.

16. An air conditioner according to claim 10, wherein the heat source-side heat exchanger is formed of a single heat exchanger, and the heat source means is composed of refrigerating means for heat source which includes a compressor, a main heat exchanger and an expansion mechanism is connected to the heat source-side heat exchange and applies low temperature heat or high temperature heat to refrigerant of the main refrigerant circuit in the heat source-side heat exchanger.

17. An air conditioner according to claim 10, wherein a plurality of the main refrigerant circuits are provided and a plurality of the refrigerating means for refrigerant transfer are provided in correspondence with the main refrigerant circuits.

18. An air conditioner according to claim 10, wherein the heat source-side heat exchanger of the main refrigerant circuit is composed of a low temperature heat source-side heat exchanger and a high temperature heat source-side heat exchanger and the main refrigerant circuit includes a plurality of the user-side heat exchangers and circulates refrigerant in a manner that refrigerant is condensed in at least one of the user-side heat exchangers and is evaporated in the other user-side heat exchangers, the heat source means is composed of refrigerating means for heat source in which a compressor, a high temperature heat source-side heat exchanger, an expansion mechanism and a low temperature heat source-side heat exchanger are connected and which evaporates refrigerant of the main refrigerant circuit in the high temperature heat source-side heat exchanger and condenses refrigerant of the main refrigerant circuit in the low temperature heat source-side heat exchanger, and both the sub-heat exchangers of the refrigerating means for refrigerant transfer are connected to some midpoint in the liquid line between the low temperature heat source-side heat exchanger and the high temperature heat source-side heat exchanger of the main refrigerant circuit.

19. An air conditioner comprising:

a main refrigerant circuit which is formed in a manner that a heat source-side heat exchanger and a user-side heat exchanger are at least connected through a refrigerant pipe and in which refrigerant is circulated in a manner to be condensed in one of the heat exchangers and to be evaporated in the other heat exchanger;

heat source means for applying heat to refrigerant, in the heat source-side heat exchanger of the main refrigerant circuit; and refrigerating means for refrigerant transfer which is formed in a manner that a compressor, a first sub-heat exchanger, an expansion mechanism and a second sub-heat exchanger are connected in this order and forms a single refrigerating cycle reciprocally operable in a manner that sub-refrigerant is condensed in one of the sub-heat exchangers and is evaporated in the other sub-heat exchanger and in which both the sub-heat exchangers are connected to some midpoint in a liquid line of the main refrigerant circuit and the sub-refrigerant cools and heats liquid refrigerant of the main refrigerant circuit thereby giving a moving force to the liquid refrigerant wherein the heat source-side heat exchanger is composed of a low temperature heat source-side heat exchanger and a high temperature heat source-side heat exchanger, and the heat source means is composed of:
a low temperature heat water circuit for circulating low temperature heat water between a heat storage tank and the low temperature heat source-side heat exchanger so that the low temperature heat water stored in the heat storage tank is supplied to the low temperature heat source-side heat exchanger thereby applying low temperature heat to refrigerant in the low temperature heat source-side heat exchanger; and refrigerating means for heat source which includes a compressor, a main heat exchanger, expansion mechanisms and a low temperature heat exchanger, is connected to the high temperature heat source-side heat exchanger, cools the low temperature heat water of the low temperature heat water circuit in the low temperature heat exchanger to store heat in the low temperature heat water circuit and applies low temperature heat or high temperature heat to refrigerant of the main refrigerant circuit in the high temperature heat source-side heat exchanger.

20. An air conditioner according to claim 19, wherein an expansion mechanism is provided at a part of the refrigerant pipe between the heat source-side heat exchanger and the user-side heat exchanger in the main refrigerant circuit.

21. An air conditioner according to claim 19, wherein a flow rate adjusting mechanism for adjusting a flow rate of refrigerant is provided at a part of the refrigerant pipe between the heat source-side heat exchanger and the user-side heat exchanger in the main refrigerant circuit.

22. An air conditioner according to claim 19, wherein the refrigerating means for refrigerant transfer heats liquid refrigerant of the main refrigerant circuit to discharge the liquid refrigerant from one of the sub-heat exchangers and cools refrigerant of the main refrigerant circuit to store liquid refrigerant in the other sub-heat exchangers.

23. An air conditioner according to claim 19, wherein the heat source means and the heat source-side heat exchanger of the main refrigerant circuit are placed in higher positions and the user-side heat exchanger of the main refrigerant circuit is placed in a lower position.

24. An air conditioner according to claim 19, wherein the user-side heat exchanger of the main refrigerant circuit is placed in a higher position and the heat source means and the heat source-side heat exchanger of the main refrigerant circuit are placed in lower positions.

25. An air conditioner according to claim 19, wherein a plurality of the main refrigerant circuits are provided and a plurality of the refrigerating means for refrigerant transfer are provided in correspondence with the main refrigerant circuits.

26. An air conditioner comprising:

a main refrigerant circuit which is formed in a manner that a heat source-side heat exchanger and a user-side heat exchanger are at least connected through a refrigerant pipe and in which refrigerant is circulated in a manner to be condensed in one of the heat exchangers and to be evaporated in the other heat exchanger;

heat source means for applying heat to refrigerant, in the heat source-side heat exchanger of the main refrigerant circuit; and refrigerating means for refrigerant transfer which is formed in a manner that a compressor, a first sub-heat exchanger, an expansion mechanism and a second sub-heat exchanger are connected in this order and forms a single refrigerating cycle reciprocally operable in a manner that sub-refrigerant is condensed in one of the sub-heat exchangers and is evaporated in the other sub-heat exchanger and in which both the sub-heat exchangers are connected to some midpoint in a liquid line of the main refrigerant circuit and the sub-refrigerant cools and heats liquid refrigerant of the main refrigerant circuit thereby giving a moving force to the liquid refrigerant wherein the heat source-side heat exchanger is formed of a single heat exchanger, the main refrigerant circuit is configured in a reciprocally operable manner that refrigerant passes through both the sub-heat exchangers of the refrigerating means for refrigerant transfer during either operation of a cooling cycle in which the heat source-side heat exchanger serves as a condenser and the user-side heat exchanger serves as an evaporator and a heating cycle in which the user-side heat exchanger serves as a condenser and the heat source-side heat exchanger serves as an evaporator, and the heat source means is composed of refrigerating means for heat source which includes a compressor, a main heat exchanger and an expansion mechanism is connected to the heat source-side heat exchanger and applies low temperature heat or high temperature heat to refrigerant of the main refrigerant circuit in the heat source-side heat exchanger.

27. An air conditioner according to claim 26, wherein an expansion mechanism is provided at a part of the refrigerant pipe between the heat source-side heat exchanger and the user-side heat exchanger in the main refrigerant circuit (20).

28. An air conditioner according to claim 26, wherein a flow rate adjusting mechanism for adjusting a flow rate of refrigerant is provided at a part of the refrigerant pipe between the heat source-side heat exchanger and the user-side heat exchanger in the main refrigerant circuit.

29. An air conditioner according to claim 26, wherein the refrigerating means for refrigerant transfer heats liquid refrigerant of the main refrigerant circuit to discharge the liquid refrigerant from one of the sub-heat exchangers and cools refrigerant of the main refrigerant circuit to store liquid refrigerant in the other sub-heat exchangers.

30. An air conditioner according to claim 26, wherein a plurality of the main refrigerant circuits are provided and a plurality of the refrigerating means for refrigerant transfer are provided in correspondence with the main refrigerant circuits.

31. An air conditioner comprising:

a main refrigerant circuit which is formed in a manner that a heat source-side heat exchanger and a user-side heat exchanger are at least connected through a refrigerant pipe and in which refrigerant is circulated in a manner to be condensed in one of the heat exchangers and to be evaporated in the other heat exchanger;

heat source means for applying heat to refrigerant, in the heat source-side heat exchanger of the main refrigerant circuit; and refrigerating means for refrigerant transfer which is formed in a manner that a compressor, a first sub-heat exchanger, an expansion mechanism and a second sub-heat exchanger are connected in this order and forms a single refrigerating cycle reciprocally operable in a manner that sub-refrigerant is condensed in one of the sub-heat exchangers and is evaporated in the other sub-heat exchanger and in which both the sub-heat exchangers are connected to some midpoint in a liquid line of the main refrigerant circuit and the sub-refrigerant cools and heats liquid refrigerant of the main refrigerant circuit thereby giving a moving force to the liquid refrigerant wherein the main refrigerant circuit is configured in a reciprocally operable manner between a cooling cycle in which the heat source-side heat exchanger serves as a condenser and the user-side heat exchanger serves as an evaporator and a heating cycle in which the user-side heat exchanger serves as a condenser and the heat source-side heat exchanger serves as an evaporator, the heat source means is composed of refrigerating means for heat source which includes a compressor, a main heat exchanger and an expansion mechanism is connected to the heat source-side heat exchanger and applies low temperature heat or high temperature heat to refrigerant of the main refrigerant circuit in the heat source-side heat exchanger, and the refrigerating means for refrigerant transfer is configured in a manner that the compressor of the refrigerating means for refrigerant transfer doubles as the compressor of the refrigerating means for heat source, the first sub-heat exchanger, the expansion mechanism an the second sub-heat exchanger arc connection in this order and are connected to the compressor of the refrigerating means for heat source, and both the sub-heat exchangers are connected to the liquid line of the main refrigerant circuit so that refrigerant in the main refrigerant circuit passes through both the sub-heat exchangers during either operation of the cooling and heating cycles of the main refrigerant circuit.

32. An air conditioner according to claim 31, wherein an expansion mechanism is provided at a part of the refrigerant pipe between the heat source-side heat exchanger and the user-side heat exchanger in the main refrigerant circuit (20).

33. An air conditioner according to claim 31, wherein a flow rate adjusting mechanism for adjusting a flow rate of refrigerant is provided at a part of the refrigerant pipe between the heat source-side heat exchanger and the user-side heat exchanger in the main refrigerant circuit.

34. An air conditioner according to claim 31, wherein the refrigerating means for refrigerant transfer heats liquid refrigerant of the main refrigerant circuit to discharge the liquid refrigerant from one of the sub-heat exchangers and cools refrigerant of the main refrigerant circuit to store liquid refrigerant in the other sub-heat exchangers.

35. An air conditioner according to claim 31, wherein a plurality of the main refrigerant circuits are provided and a plurality of the refrigerating means for refrigerant transfer are provided in correspondence with the main refrigerant circuits.

36. An air conditioner according to claim 1, wherein the heat source-side heat exchanger comprises a low temperature source-side heat exchanger and a high temperature source-side heat exchanger, and a low temperature water circuit for circulating low temperature water between a heat storage tank and the low temperature source-side heat exchanger so that the low temperature water stored in the heat storage tank is supplied to the low temperature source-side heat exchanger thereby applying low temperature to refrigerant in the low temperature source-side heat exchanger; and refrigerating mean for heat source which includes a compressor, a main heat exchanger, expansion mechanisms and a low temperature exchanger, is connected to the high temperature source-side heat exchanger, cools the low temperature water of the low temperature water circuit in the low temperature exchanger to store heat in the low temperature water circuit and applies low temperature or high temperature to refrigerant of the main refrigerant circuit in the high temperature source-side heat exchanger.

37. An air conditioner according to claim 10, wherein the heat source-side heat exchanger comprises a low temperature source-side heat exchanger and a high temperature source-side heat exchanger, and a low temperature water circuit for circulating low temperature water between a heat storage tank and the low temperature source-side heat exchanger so that the low temperature water stored in the heat storage tank is supplied to the low temperature source-side heat exchanger thereby applying low temperature to refrigerant in the low temperature source-side heat exchanger; and refrigerating means for heat source which includes a compressor, a main heat exchanger, expansion mechanisms and a low temperature exchanger, is connected to the high temperature source-side heat exchanger, cools the low temperature water of the low temperature water circuit in the low temperature exchanger to store heat in the low temperature water circuit and applies low temperature or high temperature to refrigerant of the main refrigerant circuit in the high temperature source-side heat exchanger.

* * * * *